United States Patent
Mitrovich

(10) Patent No.: US 10,703,388 B2
(45) Date of Patent: Jul. 7, 2020

(54) REFUELING ADAPTER

(71) Applicant: SpillX LLC, Seattle, WA (US)

(72) Inventor: Michael J. Mitrovich, Seattle, WA (US)

(73) Assignee: SPILLX LLC, Seattle, WA (US)

( * ) Notice: Subject to any disclaimer, the term of this patent is extended or adjusted under 35 U.S.C. 154(b) by 970 days.

(21) Appl. No.: 15/216,800

(22) Filed: Jul. 22, 2016

(65) Prior Publication Data

US 2017/0159856 A1    Jun. 8, 2017

Related U.S. Application Data

(60) Provisional application No. 62/262,744, filed on Dec. 3, 2015.

(51) Int. Cl.
| | | |
|---|---|---|
| B61C 17/00 | (2006.01) | |
| F16L 37/252 | (2006.01) | |
| F16L 25/14 | (2006.01) | |
| B67D 1/00 | (2006.01) | |
| F16L 37/47 | (2006.01) | |

(52) U.S. Cl.
CPC ........... B61C 17/00 (2013.01); B67D 1/00 (2013.01); F16L 25/14 (2013.01); F16L 37/252 (2013.01); F16L 37/47 (2013.01)

(58) Field of Classification Search
CPC ...... B67D 7/42; B67D 7/3218; B67D 7/3245; B67D 7/04; B67D 2007/0421; B60K 15/04; F16L 37/252
USPC ....................................................... 285/1, 62
See application file for complete search history.

(56) References Cited

U.S. PATENT DOCUMENTS

| | | | |
|---|---|---|---|
| 421,788 | A | 2/1890 | Valentine |
| 559,358 | A | 5/1896 | Burt |
| 751,096 | A | 2/1904 | Nethery |
| 993,628 | A | 5/1911 | Williams et al. |
| 1,047,863 | A | 12/1912 | Wall et al. |
| 1,182,003 | A | 5/1916 | Fessenden et al. |
| 1,182,027 | A | 5/1916 | Martin et al. |
| 1,209,355 | A | 12/1916 | Sutherland et al. |

(Continued)

FOREIGN PATENT DOCUMENTS

| | | |
|---|---|---|
| EP | 0144549 A1 | 6/1985 |
| GB | 1153381 A | 5/1969 |

(Continued)

OTHER PUBLICATIONS

International Search Report and Written Opinion on International Application No. PCT/US2011/030445, dated Dec. 7, 2011.

(Continued)

*Primary Examiner* — Zachary T Dragicevich
(74) *Attorney, Agent, or Firm* — Colby Nipper PLLC

(57) ABSTRACT

A refueling adapter configured for permitting a vehicle having a twist-lock coupling-style fuel receiver to be fueled from a fuel source having a dry-break coupling-style fuel dispenser. The refueling adapter having a body portion and a mating assembly. The body portion has a first end and second end. The first end of the body portion is configured for dry-break coupling with a fuel dispenser. The second end of the body portion is configured for rotatable engagement with the mating assembly. The mating assembly is configured for engagement with a twist-lock coupling-style fuel receiver.

19 Claims, 18 Drawing Sheets

(56) References Cited

U.S. PATENT DOCUMENTS

| | | |
|---|---|---|
| 1,302,538 A | 5/1919 | Gulick et al. |
| 1,525,247 A | 2/1925 | Leiss et al. |
| 1,555,755 A | 9/1925 | Pratt et al. |
| 1,676,084 A | 7/1928 | Flagg et al. |
| 1,694,072 A | 12/1928 | Manion et al. |
| 1,744,559 A | 1/1930 | Locke et al. |
| 1,762,306 A | 6/1930 | Mueller et al. |
| 1,788,827 A | 1/1931 | Ferrin et al. |
| 1,826,088 A | 10/1931 | Joel et al. |
| 2,092,670 A | 9/1937 | Hess et al. |
| 2,477,186 A | 7/1949 | Koehler et al. |
| 2,595,166 A | 4/1952 | Rhodes et al. |
| 2,825,526 A | 3/1958 | Zuiderhoek et al. |
| 2,896,840 A | 7/1959 | Hendry et al. |
| 3,020,924 A | 2/1962 | Davies et al. |
| 3,047,009 A | 7/1962 | Hunter et al. |
| 3,055,405 A | 9/1962 | Pase et al. |
| 3,156,271 A | 11/1964 | Rudolf et al. |
| 3,168,105 A | 2/1965 | Cisco et al. |
| 3,254,399 A | 6/1966 | Zahuranec et al. |
| 3,269,404 A | 8/1966 | Lebow et al. |
| 3,335,746 A | 8/1967 | Lebow et al. |
| 3,406,709 A | 10/1968 | Elbogen et al. |
| 3,485,262 A | 12/1969 | Perren et al. |
| 3,561,465 A | 2/1971 | Graaf et al. |
| 3,587,622 A | 6/1971 | Hardison et al. |
| 3,610,571 A | 10/1971 | Cisco et al. |
| 3,618,643 A | 11/1971 | Thomson et al. |
| 3,662,793 A | 5/1972 | Calisher et al. |
| 3,703,907 A | 11/1972 | Richards et al. |
| 3,726,303 A | 4/1973 | Allen et al. |
| 3,845,262 A | 10/1974 | Hundstad |
| 3,892,254 A | 7/1975 | Hilgert |
| 3,896,840 A | 7/1975 | Andersson |
| 3,907,248 A | 9/1975 | Coulbeck |
| 3,929,155 A | 12/1975 | Garretson |
| 3,982,557 A | 9/1976 | Acevedo |
| 4,006,762 A | 2/1977 | Badger |
| 4,024,887 A | 5/1977 | McGregor |
| 4,064,907 A | 12/1977 | Billington et al. |
| 4,075,912 A | 2/1978 | Schaefer |
| 4,157,104 A | 6/1979 | Lofquist, Jr. |
| 4,161,188 A | 7/1979 | Jorgensen |
| 4,211,249 A | 7/1980 | Richards |
| 4,292,996 A | 10/1981 | Pataki et al. |
| 4,305,422 A | 12/1981 | Bannink |
| 4,312,373 A | 1/1982 | Tilling et al. |
| 4,313,459 A | 2/1982 | Mylander |
| 4,420,022 A | 12/1983 | Landry |
| 4,441,533 A | 4/1984 | Snyder et al. |
| 4,471,798 A | 9/1984 | Johannesen |
| 4,483,359 A | 11/1984 | Robertson |
| 4,484,601 A | 11/1984 | Campau |
| 4,515,178 A | 5/1985 | Campau |
| 4,522,226 A | 6/1985 | Yamagiwa |
| 4,527,593 A | 7/1985 | Campau |
| 4,567,924 A * | 2/1986 | Brown ............... F16L 37/252 |
| 4,621,839 A | 11/1986 | Duell et al. |
| 4,630,749 A | 12/1986 | Armstrong et al. |
| 4,770,317 A | 9/1988 | Podgers et al. |
| 4,883,229 A | 11/1989 | Moeller |
| 5,002,154 A | 3/1991 | Chen |
| 5,027,871 A | 7/1991 | Guenther |
| 5,168,891 A | 12/1992 | Green et al. |
| 5,279,121 A | 1/1994 | Barber |
| 5,282,496 A | 2/1994 | Kerger |
| 5,285,812 A | 2/1994 | Morales |
| 5,289,856 A | 3/1994 | Strock et al. |
| 5,327,943 A | 7/1994 | Strock et al. |
| 5,354,101 A | 10/1994 | Anderson, Jr. |
| 5,454,421 A | 10/1995 | Kerger et al. |
| 5,460,197 A | 10/1995 | Kerger et al. |
| 5,487,404 A | 1/1996 | Kerger |
| 5,642,752 A | 7/1997 | Yokota et al. |
| 5,649,577 A | 7/1997 | Farkas |
| 5,685,331 A | 11/1997 | Westermeyer |
| 5,727,608 A | 3/1998 | Nusbaumer et al. |
| 5,785,100 A | 7/1998 | Showalter et al. |
| 5,787,942 A | 8/1998 | Preston et al. |
| 5,813,432 A | 9/1998 | Elsdon et al. |
| 5,829,465 A | 11/1998 | Garretson |
| 5,832,953 A | 11/1998 | Lattner et al. |
| 5,839,465 A | 11/1998 | Phillips et al. |
| 5,842,500 A | 12/1998 | Rockwood et al. |
| 5,887,609 A | 3/1999 | Garretson |
| 5,921,272 A | 7/1999 | Cavagna |
| 5,927,350 A | 7/1999 | Kissinger, Jr. |
| 5,944,069 A | 8/1999 | Nusbaumer et al. |
| 5,954,101 A | 9/1999 | Drube et al. |
| 5,992,445 A | 11/1999 | Pagani |
| 6,026,841 A | 2/2000 | Kozik |
| D421,788 S | 3/2000 | Kingman |
| 6,035,888 A | 3/2000 | Gil |
| 6,076,546 A | 6/2000 | Waters |
| 6,078,850 A | 6/2000 | Kane et al. |
| 6,079,438 A | 6/2000 | Cavagna |
| 6,082,392 A | 7/2000 | Watkins, Jr. |
| 6,109,314 A | 8/2000 | Christophe et al. |
| 6,138,709 A | 10/2000 | Home |
| 6,178,994 B1 | 1/2001 | Park |
| 6,227,233 B1 | 5/2001 | Kozik |
| 6,230,730 B1 | 5/2001 | Garretson |
| 6,247,492 B1 | 6/2001 | Stuart |
| 6,257,287 B1 | 7/2001 | Kippe et al. |
| 6,263,905 B1 | 7/2001 | Yokota et al. |
| 6,293,302 B1 | 9/2001 | Waters et al. |
| 6,311,723 B1 | 11/2001 | Shipp et al. |
| 6,318,406 B1 | 11/2001 | Conley |
| 6,318,421 B1 | 11/2001 | Lagache |
| 6,371,175 B1 | 4/2002 | Nusbaumer et al. |
| 6,408,869 B1 | 6/2002 | Bartos et al. |
| 6,415,813 B1 | 7/2002 | Kraft |
| 6,450,196 B1 | 9/2002 | Bartos et al. |
| 6,536,465 B2 | 3/2003 | David et al. |
| 6,557,579 B2 | 5/2003 | Kozik |
| 6,640,829 B1 | 11/2003 | Kerger |
| 6,732,770 B1 | 5/2004 | Nusbaumer et al. |
| 6,810,905 B1 | 11/2004 | Watson et al. |
| 6,837,262 B2 | 1/2005 | Cortez et al. |
| 6,837,263 B2 | 1/2005 | Kramer |
| 6,874,528 B2 | 4/2005 | Kozik et al. |
| 6,910,499 B2 | 6/2005 | Chan |
| 6,948,538 B1 | 9/2005 | Nusbaumer et al. |
| 7,089,974 B2 | 8/2006 | Stuart |
| 7,258,130 B2 | 8/2007 | Cortez |
| D559,358 S | 1/2008 | Moura de Oliveira |
| 7,584,766 B2 | 9/2009 | David et al. |
| 7,584,966 B2 | 9/2009 | Snow |
| 7,647,163 B2 | 1/2010 | Allen |
| 7,686,037 B2 * | 3/2010 | Krywitsky ............ F16L 37/252 |
| 7,757,709 B2 | 7/2010 | Cortez |
| 7,793,682 B2 | 9/2010 | Smit |
| 7,886,781 B2 | 2/2011 | Burkholder |
| 7,891,373 B2 | 2/2011 | Workman et al. |
| 8,025,076 B2 | 9/2011 | Smit |
| 8,281,823 B2 | 10/2012 | Mitrovich |
| 8,430,117 B2 | 4/2013 | Mitrovich |
| 8,550,128 B2 | 10/2013 | Mitrovich |
| 8,631,818 B2 | 1/2014 | Mitrovich |
| 8,955,561 B2 | 2/2015 | Mitrovich |
| 9,938,022 B2 * | 4/2018 | Gammon |
| 2002/0148505 A1 | 10/2002 | David et al. |
| 2005/0166993 A1 | 8/2005 | Viken et al. |
| 2005/0274428 A1 | 12/2005 | Grabher |
| 2008/0178944 A1 | 7/2008 | Workman et al. |
| 2009/0032748 A1 | 2/2009 | Kidprasert |
| 2013/0032248 A1 | 2/2013 | Mitrovich |
| 2014/0137629 A1 | 5/2014 | Murnane, Jr. et al. |
| 2014/0261884 A1 | 9/2014 | Quang |

FOREIGN PATENT DOCUMENTS

| | | |
|---|---|---|
| GB | 1193007 | 5/1970 |
| GB | 1440107 | 5/1970 |

(56) References Cited

FOREIGN PATENT DOCUMENTS

| GB | 1335188 | | 10/1973 |
|----|---------|---|---------|
| GB | 1541110 | | 2/1979 |
| GB | 2317382 | A | 3/1998 |
| JP | 6069839 | B2 | 9/1994 |
| JP | 2003506238 | A | 2/2003 |
| JP | 2004116858 | A | 4/2004 |
| KR | 1020020059682 | A | 7/2002 |
| RU | 2200302 | C2 | 3/2003 |
| SU | 492859 | A1 | 11/1975 |
| SU | 594044 | A1 | 2/1978 |
| SU | 1188706 | A1 | 10/1985 |
| SU | 1264145 | A1 | 10/1986 |
| SU | 1798986 | A1 | 5/1996 |
| WO | 2011139430 | A2 | 11/2011 |
| WO | 2013003028 | A1 | 1/2013 |
| WO | 2013052667 | A1 | 4/2013 |
| WO | 2013052687 | A2 | 4/2013 |

OTHER PUBLICATIONS

International Search Report and Written Opinion on International Application No. PCT/US2012/042058, dated Sep. 21, 2012.
International Search Report and Written Opinion on International Application No. PCT/US2012/058752, dated Feb. 7, 2013.
International Search Report and Written Opinion on International Application No. PCT/US2012/058783, dated Mar. 21, 2013.
Meggitt Fuelling Products, Jet Level Sensor Overfill Protection F613, pamphlet.
Great Britain Search Report on GB961950.5, searched dated Dec. 15, 1997.

* cited by examiner

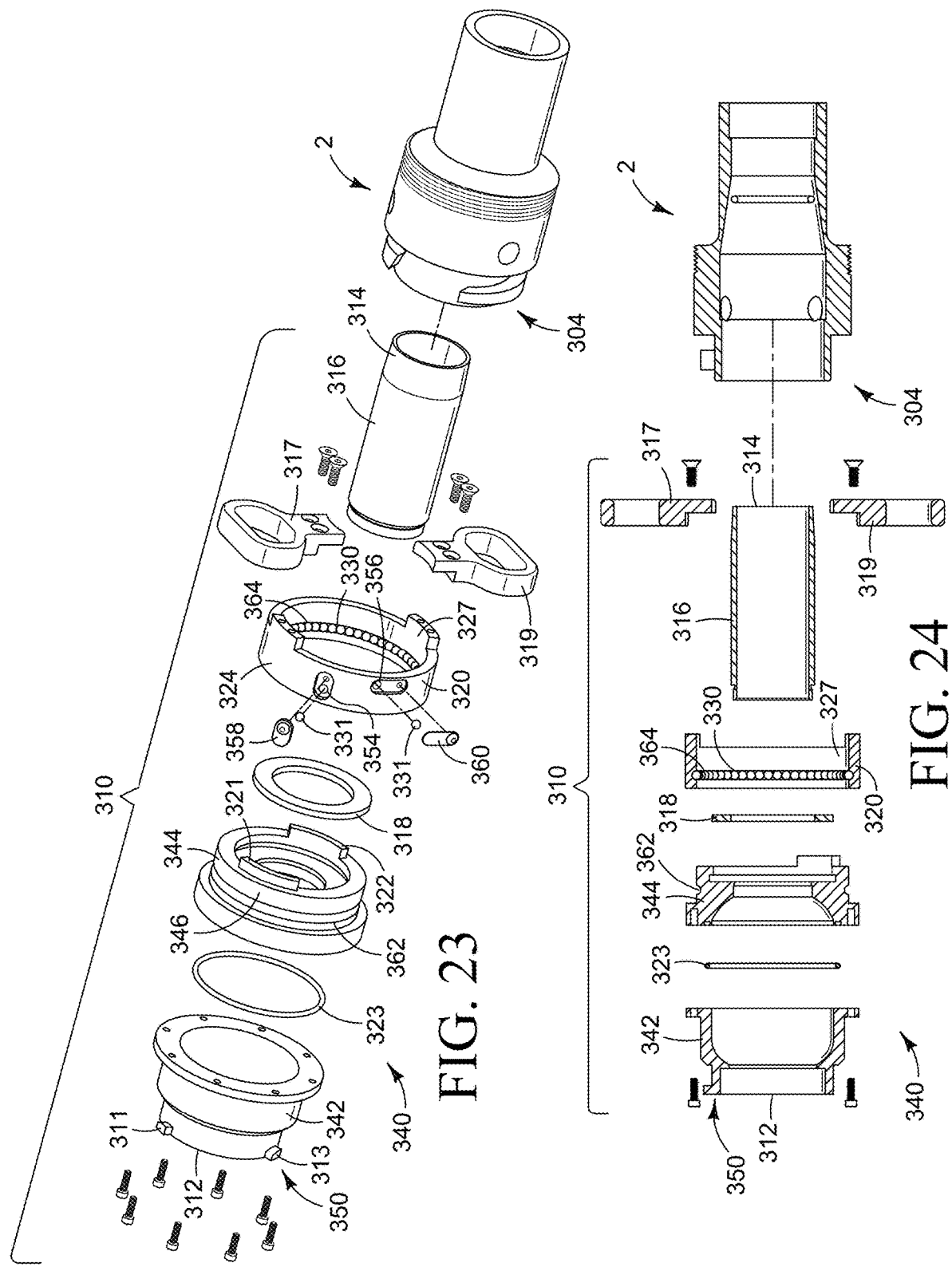

REFUELING ADAPTER

PRIORITY/CROSS-REFERENCE TO RELATED APPLICATIONS

This application claims the benefit of U.S. Provisional Application No. 62/262,744, filed 3 Dec. 2015, the disclosure of which is incorporated by reference.

TECHNICAL FIELD

The disclosure generally relates to the field of quick-disconnect refueling apparatuses, and more particularly with adapters used with such apparatuses.

BACKGROUND

There is a wide range of connection standards used today in the fueling industry. This ranges from threaded connections using standards such as National Pipe Thread Taper (NPT), which is a U.S. standard for tapered threads used on threaded pipes and fittings to prevent leaks, to quick connect fittings such as cam locks and dry-break interface standards. Often times it is required to connect two different standards and an adapter is required to ensure proper sealing of both connection types to prevent any possible leaks.

A first connection standard for fueling dispensers can be found in U.S. Pat. No. 4,441,533 (Snyder) which describes an automatic fuel dispenser for the fueling of locomotive fuel tanks, and the connection standard (aka a twist-lock coupling) used to connect the dispenser with the fill tube of the fuel tank on the locomotive. To accomplish this connection, a fill pipe receiver is installed into the fill tube of the locomotive fuel tank. The fill pipe receiver contains an outer ring with two openings or "gaps" designed to accommodate the attachment portion of the fuel dispenser. The Snyder fuel dispenser is provided with an outer ring-like shoulder which cooperates with a compressing seal and locking element containing two L-shaped attachment points. The L-shaped attachment points of the fuel dispenser are designed to engage with the outer ring of the receiver by sliding through the gaps until they are below the outer ring and then turning in a first direction to form a locked-on and sealed connection between the fuel dispenser and receiver. To disconnect the fuel dispenser from the receiver, the outer ring of the fuel dispenser is turned in a second direction and the fuel dispenser is removed from the receiver.

A second connection standard for fueling dispensers can be found in aviation military specification standard (MS 24484), aka a dry-break coupling, a dry aviation coupling, and a dry-disconnect coupling. Dry-break couplings are commonly used for under wing fueling of aircraft. Dry-break couplings cannot be "opened" or otherwise allow fuel to flow therethrough until the dry-break coupling has been securely connected to a mating receptacle.

A dry-break coupling uses a different connection method and size than that specified in twist-lock couplings such as U.S. Pat. No. 4,441,533, therefore making dry-break couplings generally incompatible with twist-lock coupling-style fuel receivers (which are configured for use with twist-lock coupling-style fuel dispensers).

SUMMARY OF THE DISCLOSURE

Several exemplary refueling adapters are described herein. A first exemplary refueling adapter is configured for permitting a vehicle having a twist-lock coupling-style fuel receiver to be fueled from a fuel source having a dry-break coupling-style fuel dispenser. The first exemplary refueling adapter comprises a body portion and a mating assembly, the first end of the body portion being configured for dry-break coupling with a fuel dispenser and the second end of the body portion configured for rotatable engagement with the mating assembly.

Further, the mating assembly of the first exemplary refueling adapter is configured for rotatable engagement with a twist-lock coupling-style fuel receiver. When the dry-break coupling-style fuel dispenser is opened, fuel flows from the dry-break coupling-style fuel dispenser, through the refueling adapter, through the twist-lock coupling-style fuel receiver, and into a fuel tank. Conversely, when the dry-break coupling-style fuel dispenser is closed, fuel does not flow from the dry-break coupling-style fuel dispenser, through the refueling adapter, through the twist-lock coupling-style fuel receiver, and into a fuel tank.

Additionally, a second exemplary refueling adapter is comprises a body portion and mating assembly. The body portion of the second exemplary refueling adapter further having a first end and second end, a nozzle adjacent the second end. Additionally, the body portion contains a radial flange adjacent the second end wherein the radial flange further possesses a radial race configured for receiving at least one ball bearing and a mating radial race configured for receiving at least one ball bearing.

The mating assembly of the second exemplary refueling adapter comprises a first handle and second handle, the first handle possessing a first flange and the second handle possessing a second flange. Both the first handle and second handle are configured to rotate the mating assembly about the radial flange, relative to the body portion.

Further, the first end of the body portion is configured for dry-break coupling with a fuel dispenser and the second end of the body portion configured for rotatable engagement with the mating assembly. The mating assembly, itself, is configured for rotatable engagement with a twist-lock coupling-style fuel receiver, wherein the first flange and second flange of the refueling adapter engage a first lug and second lug on the twist-lock coupling-style fuel receiver. Thus, when the dry-break coupling-style fuel dispenser is opened, by rotating the first handle and second handle of the mating assembly first direction about the radial flange, fuel flows from the dry-break coupling-style fuel dispenser, through the refueling adapter, through the twist-lock coupling-style fuel receiver, and into a fuel tank. Conversely, when the dry-break coupling-style fuel dispenser is closed, by rotating the first handle and second handle of the mating assembly in a first direction about the radial flange, fuel does not flow from the dry-break coupling-style fuel dispenser, through the refueling adapter, through the twist-lock coupling-style fuel receiver, and into a fuel tank.

Additional understanding of the devices and methods contemplated and/or claimed by the inventor can be gained by reviewing the detailed description of exemplary devices and methods, presented below, and the referenced drawings.

BRIEF DESCRIPTION OF THE DRAWINGS

FIG. 23 is a second end perspective exploded view of the third exemplary refueling adapter.

FIG. 24 is a side cross sectional exploded view of the third exemplary refueling adapter.

DEFINITIONS

Figure 1:
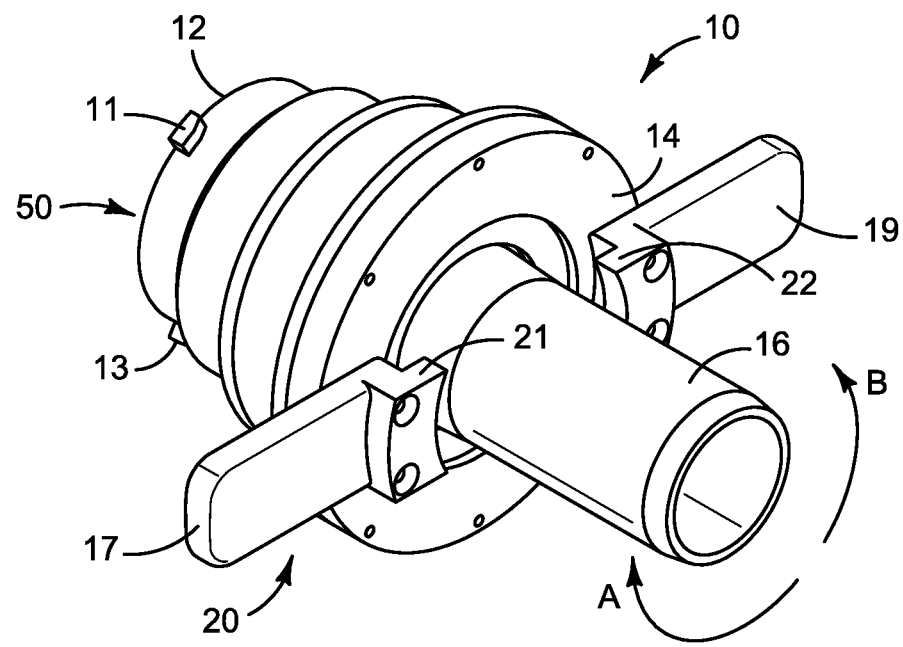
FIG. 1 is a second end perspective view of a first exemplary refueling adapter.
Figure 2:
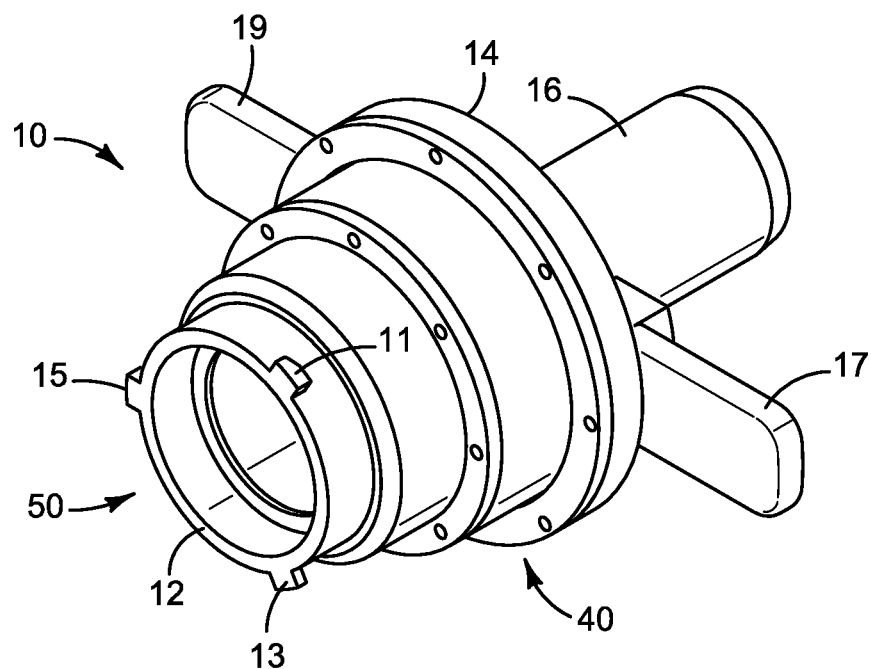
FIG. 2 is a first end perspective view of the first exemplary refueling adapter.
Figure 3:
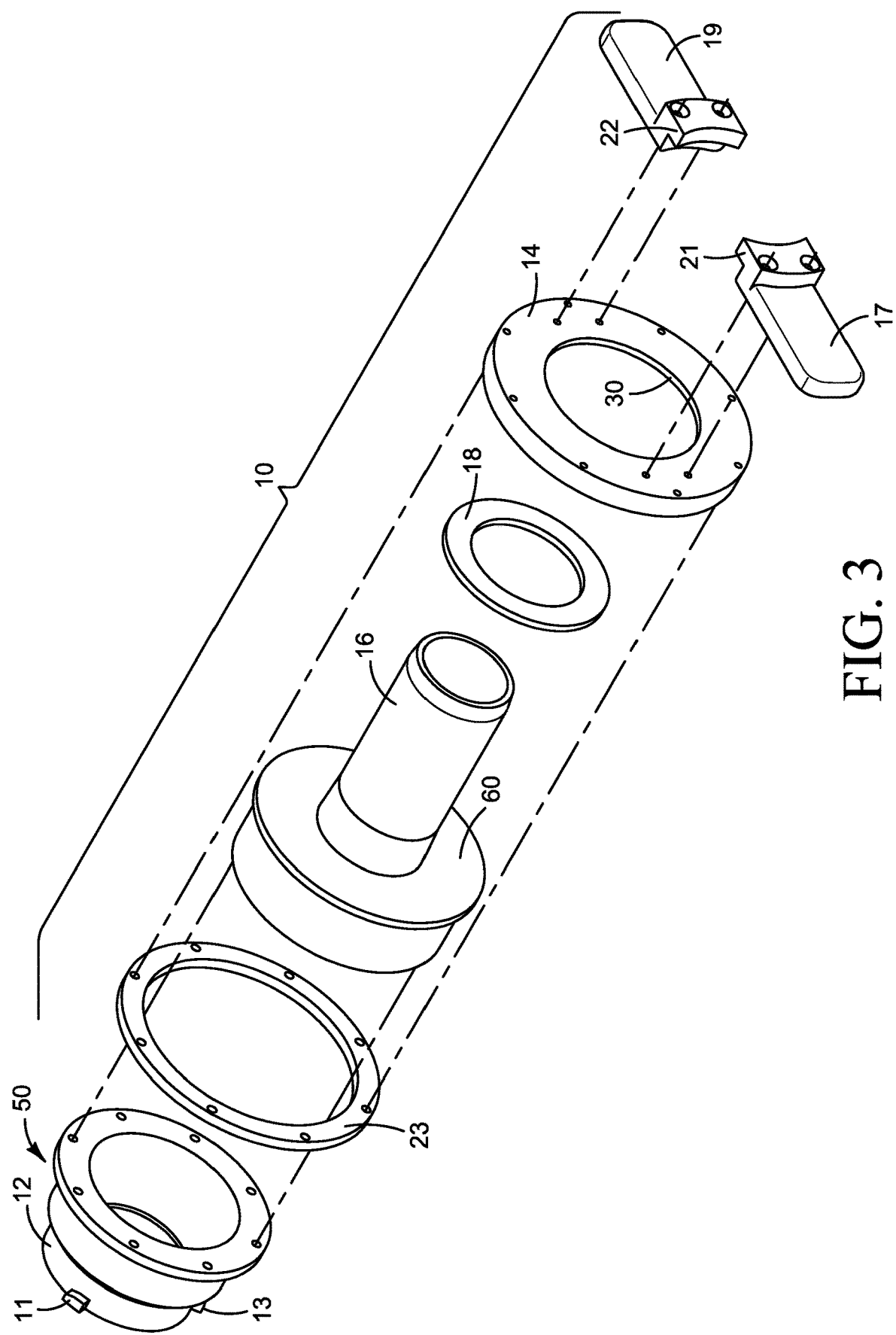
FIG. 3 is a second end perspective exploded view of the first exemplary refueling adapter.
Figure 4:
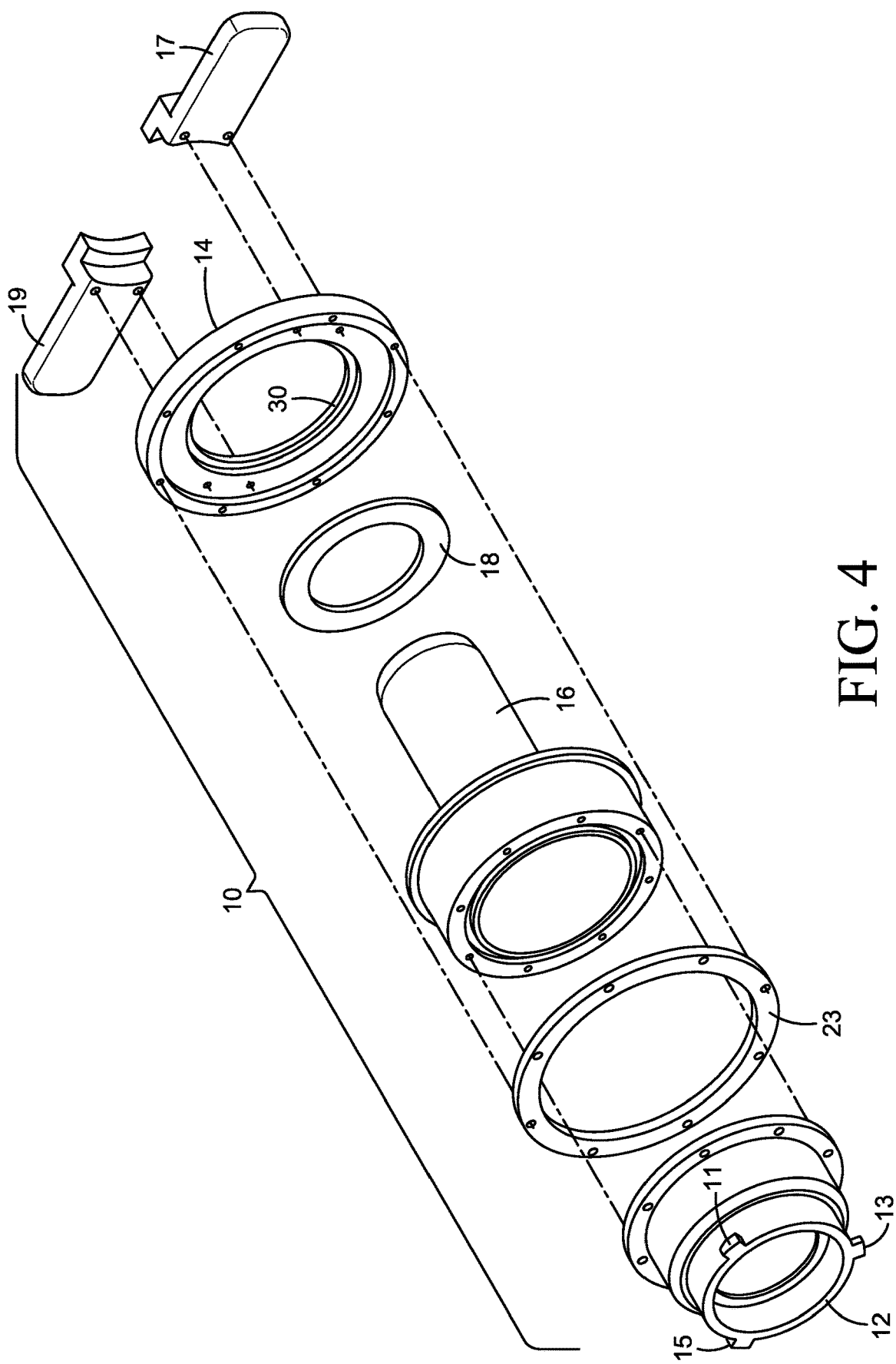
FIG. 4 is a first end perspective exploded view of the first exemplary refueling adapter.
Figure 5:
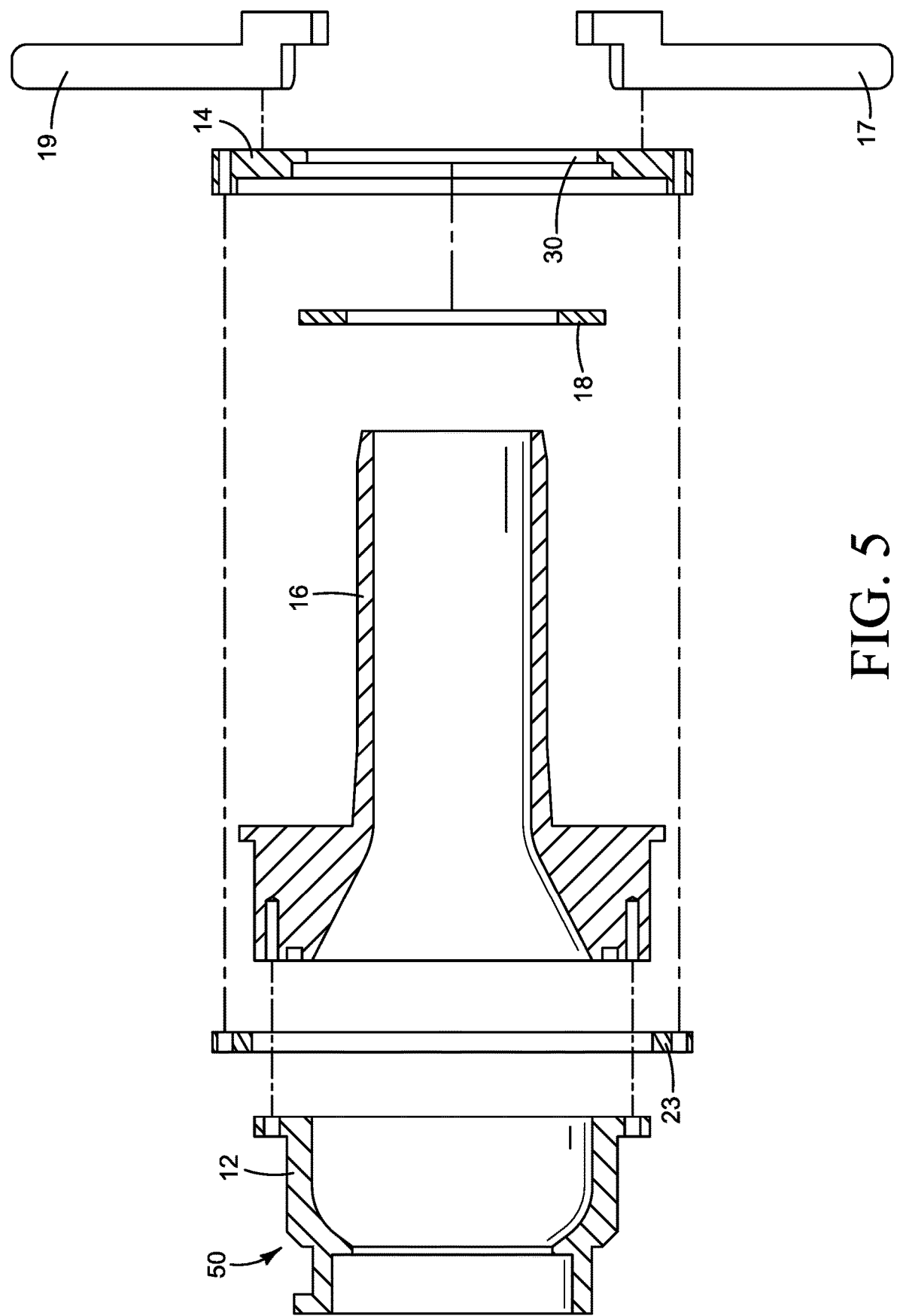
FIG. 5 is a side cross sectional exploded view of the first exemplary refueling adapter.
Figure 6:
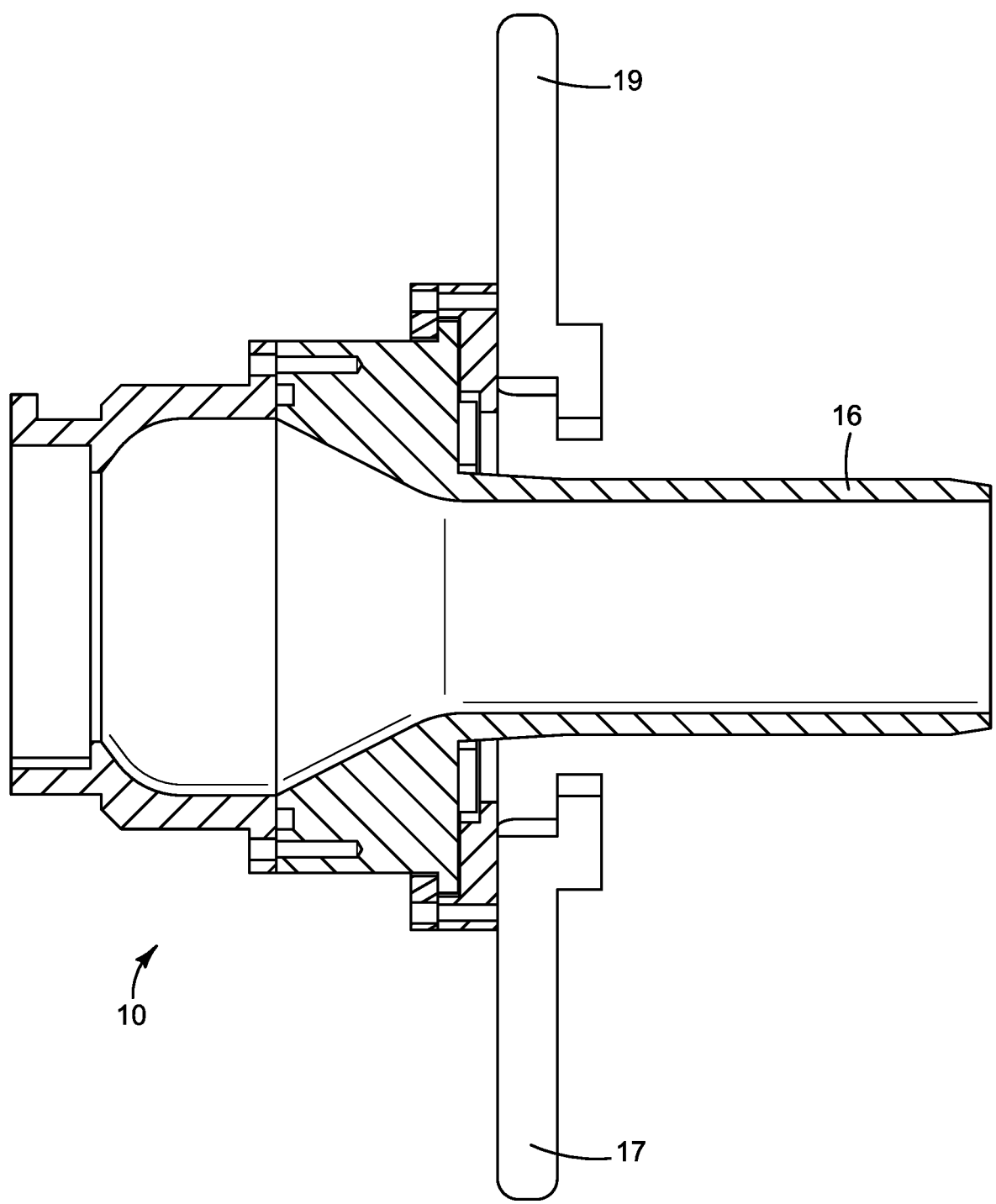
FIG. 6 is a side cross sectional view of the first exemplary refueling adapter.
Figure 7:
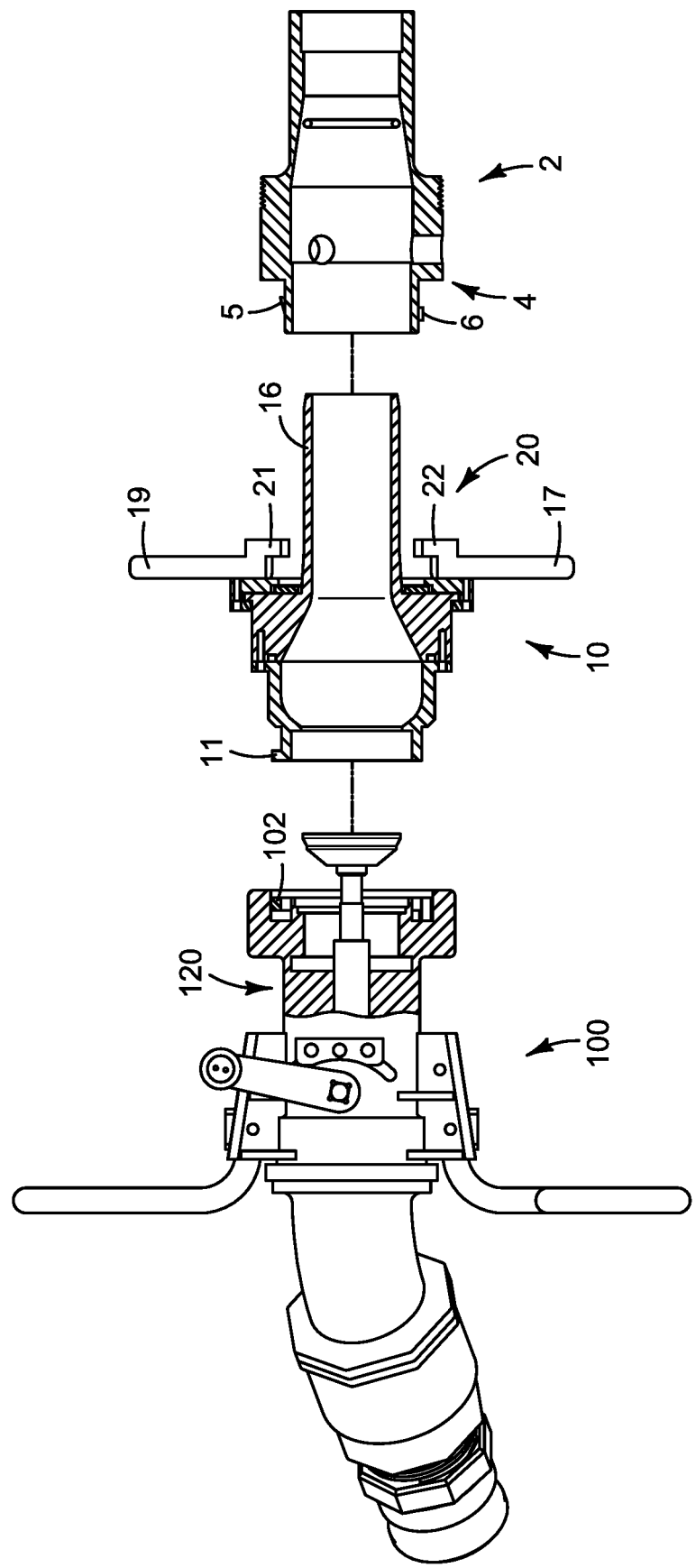
FIG. 7 is an environmental side cross sectional view of the first exemplary refueling adapter before connection.

The use of "e.g.," "etc," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise. The use of the articles "a," "an" and "the" are meant to be interpreted as referring to the singular as well as the plural, unless the context clearly dictates otherwise. Thus, for example, reference to "a handle" includes two or more such handles, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

The use of "locomotive" and grammatically related terms means "a rail transport vehicle," unless the context clearly dictates otherwise.

The use of "vehicle" means "an object used for transporting people or goods," unless the context clearly dictates otherwise. A locomotive is a type of vehicle.

The use of "flapper" and grammatically related terms means "a flapper-style valve," unless the context clearly dictates otherwise.

The use of "API Style coupler" and grammatically related terms means "a bottom loading and vapor recovery connector," for instance of the type defined in the standard API Recommended Practice 1004, unless the context clearly dictates otherwise.

The use of "MS 24484" and grammatically related terms means "a military-aviation-style dry-break connection, possessing specification standard MS 24484" unless the context clearly dictates otherwise.

The use of "dry-break coupling" and grammatically related terms means "a coupling where the coupling parts separate from each other without spillage of fluid," unless the context clearly dictates otherwise.

The use of "twist-lock coupling-style fuel receiver" and grammatically related terms means "any fuel receiver capable of attachment via a twist-lock connection," unless the context clearly dictates otherwise.

The use of "cammed" and grammatically-related terms means "to attach through the use of a cam," unless the context clearly dictates otherwise.

DETAILED DESCRIPTION

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The inventive concept(s) disclosed herein relate to refueling adapters configured for permitting a locomotive or other vehicle having a twist-lock coupling-style fuel receiver to be fueled from a fuel source having a dry-break coupling-style fuel dispenser.

FIGS. 1 through 11 illustrate a first exemplary refueling adapter 10. The refueling adapter 10 comprises a mating assembly 20 and a body portion 40. It is preferred that the dispenser connector assembly 50 be securely attached to the body portion 40 of the refueling adapter 10 to ensure that they are not able to rotate independent of each other. As discussed below, the mating assembly 20 is a twist-lock coupling-style connector configured for rotatable engagement with a twist-lock coupling-style fuel receiver 2, such that mating assembly 20 rotates relative to the twist-lock coupling-style fuel receiver, (illustrated in FIGS. 7 through 11) at its connection assembly 4.

The body portion 40 comprises a first end 12 and a second end 14, and has a fuel passageway defined therethrough. The first end 12 comprises a dispenser connector assembly 50. The dispenser connector assembly 50 is a dry-break coupling-style connector comprising at least one lug, preferably a plurality of lugs. In the first exemplary refueling adapter 10 illustrated in FIGS. 1 through 11, the dispenser connector assembly 50 comprises a first lug 11, a second lug 13 and a third lug 15. The first lug 11 is configured for interlocking engagement with a first L-shaped attachment channel 102 (illustrated in FIG. 8) within the dry-break coupling 120. Likewise, the second lug 13 is configured for interlocking engagement with a second L-shaped attachment channel 104, and the third lug 15 is configured for interlocking engagement with a third L-shaped attachment channel (not illustrated). The interlocking engagement enabling the refueling adapter 10 to sealing engage the dry-break coupling 120, thereby enabling the fueling dispenser 100 to be connected to the refueling adapter 10 in a manner that ensures a positive seal and no fuel leaks. Preferably, this interlocking engagement comprises the three-lug connection interface defined in MS 24484.

In such a configuration, while no dry-break poppet is installed on the refueling adapter 10, the combined dry-break coupling 120 and fuel dispenser 100 still effectively have a dry-break connection.

Extending from the second end 14 of the body portion 40 of the refueling adapter 10 is a nozzle 16. Preferably, the nozzle 16 has the same general nozzle geometry as a nozzle on a twist-lock coupling-style fuel dispenser (not illustrated), such as that illustrated in U.S. Pat. No. 4,441,533. It is further preferred that the length of the nozzle 16 is generally the same length as a nozzle on a twist-lock coupling-style fuel dispenser (such as that illustrated in U.S. Pat. No. 4,441,533) in order to enable the nozzle 16 to open the flapper (not illustrated) which is provided in the bottom of a twist-lock coupling-style fuel receiver 2. Despite the preferred nozzle geometry and length, any suitable structure and/or material can be used for the nozzle, and a skilled artisan will be able to select an appropriate structure and material for the nozzle geometry and length in a particular embodiment based on various considerations, including the intended use of the nozzle, the intended arena within which the nozzle will be used, and the equipment and/or accessories with which the nozzle is intended to be used, among other considerations.

Referring back to FIGS. 1 though 6, the body portion 40, at the second end 14, preferably comprises a gasket 18 which is configured for sealing the refueling adapter 10 to the twist-lock coupling-style fuel receiver 2. The preferred gasket 18 comprises rubber, however any suitable material can be used for the gasket, and a skilled artisan will be able to select an appropriate material for the gasket in a particular embodiment having a gasket based on various considerations, including the intended use of the refueling adapter, the intended arena within which the refueling adapter will be used, and the equipment and/or accessories with which the refueling adapter is intended to be used, among other considerations.

The body portion 40 is configured for operative attachment with the twist-lock coupling-style fuel receiver 2 (illustrated in FIG. 7) via the mating assembly 20. The mating assembly 20 is rotatably attached to the body portion 40 via a rotational connector, allowing at least ninety degree rotation in both a first direction and second direction.

The mating assembly 20 is configured to rotate relative to the body portion 40 and the dispenser connector assembly 50. In the first exemplary refueling adapter 10 illustrated in these Figures, the body portion 40 comprises a radial flange 30 at or adjacent the second end 14. The mating assembly 20 comprises an engagement portion 60 configured for engaging the radial flange 30, allowing the mating assembly 20 to be rotated relative to the body portion 40. The radial flange 30 and engagement portion 60 comprising the rotational connector. When rotated in a first direction, the mating assembly 20 is capable of rotatable engagement with the twist-lock coupling-style fuel receiver 2. Specifically, the mating assembly 20 rotates relative to the twist-lock coupling-style fuel receiver 2 and engages therewith. Conversely, when rotated in a second direction, the mating assembly 20 is capable of rotatable disengagement with the twist-lock coupling-style fuel receiver 2.

The mating assembly 20 comprises at least handle, for instance a first handle 17 and a second handle 19. The first handle 17 and the second handle 19 are for rotating the mating assembly 20 in a first direction and second direction. When the first handle 17 and second handle 19 are rotated in a first direction, the mating assembly 20 can be engaged with the twist-lock coupling-style fuel receiver 2. Conversely, when the first handle 17 and second handle 19 are rotated in a second direction, the mating assembly 20 can be disengaged with the twist-lock coupling-style fuel receiver 2. Further, the first handle 17 and second handle 19 allow a user to easily transport the mating assembly 20. While the first exemplary refueling adapter is illustrated as having two handles, a skilled artisan will be able to select an appropriate number and structure for the handles in a particular embodiment based on various considerations, including the intended use of the refueling adapter, the intended arena within which the refueling adapter will be used, and the equipment and/or accessories with which the refueling adapter is intended to be used, among other considerations.

The mating assembly 20 is configured to rotate relative to body portion 40 and the nozzle 16 extending therethrough. The first handle 17 comprises a first flange 21, and the second handle 19 comprises a second flange 22. The first flange 21 and second flange 22 are configured for engaging a first lug 5 and a second lug 6 on the connection assembly 4 of the twist-lock coupling-style fuel receiver 2 (illustrated in FIG. 7), thereby allowing the mating assembly 20 to be cammed onto the twist-lock coupling-style fuel receiver 2 at its connection assembly 4. By rotating both the first handle 17 and the second handle 19 in a first direction, this secures the refueling adapter 10 to twist-lock coupling-style fuel receiver 2, and creates a positive seal against the gasket 18. Likewise, by turning the mating assembly 20 in a second direction, the refueling adapter 10 can be then lifted off the twist-lock coupling-style fuel receiver 2 to disconnect the fuel dispenser 100 from the vehicle.

Alternative connection standards besides MS 24484 could be specified such as a range of API-style couplers, cam locks and a range of other dry-break connections for the top of the adapter. Thus, any suitable structure can be used for the connection standards, and a skilled artisan will be able to select an appropriate structure for the connection standards in a particular embodiment based on various considerations, including the intended use of the refueling adapter, the intended arena within which the refueling adapter will be used, and the equipment and/or accessories with which the refueling adapter is intended to be used, among other considerations.

FIGS. 7 through 11 illustrate an exemplary dry-break coupling 120 between the fuel dispenser 100 and refueling adapter 10, in addition to a twist-lock coupling-style fuel receiver 2 FIGS. 7 through 11 illustrate the refueling adapter 10 configured for permitting a vehicle having a twist-lock coupling-style fuel receiver 2 to be fueled from a fuel source (not illustrated) fluidly connected to a fuel dispenser 100 having a dry-break coupling 120 via a fuel hose (not illustrated). The dry-break coupling 120 is configured such that an automatic mechanism seals off fuel from flowing out of the fuel dispenser 100 when the fuel dispenser 100 is not connected to a suitable receiver. The twist-lock coupling-style fuel receiver 2 is attached to the fuel tank (not illustrated) so that fuel flowing from a fuel source (not illustrated), through the fuel dispenser 100, and through the twist-lock coupling-style fuel receiver 2 flows into the fuel tank.

The mating assembly 20 of the first exemplary refueling adapter 10 is configured for rotatable engagement with the twist-lock coupling-style fuel receiver 2 at its connection assembly 4. This rotatable engagement allowing the dry-break coupling 120 to be opened and fuel to flow from the fuel dispenser 100, through the dry-break coupling 120, through the refueling adapter 10, through the twist-lock coupling-style fuel receiver 2, and into the fuel tank.

In use, the refueling adapter 10 could be first installed onto the twist-lock coupling-style fuel receiver 2, or could be first installed onto the dry-break coupling 120 of the fuel dispenser 100. A skilled artisan will be able to select an appropriate installation order in a particular embodiment based on various considerations, including the intended use of the refueling adapter, the intended arena within which the refueling adapter will be used, and the equipment and/or accessories with which the refueling adapter is intended to be used, among other considerations.

However, in order to maximize safety and prevent fuel spills, it is preferred that the system be connected in a certain order. Namely, that the refueling adapter 10 first be connected to the twist-lock coupling-style fuel receiver 2. To connect the refueling adapter 10 with the twist-lock coupling-style fuel receiver 2, the refueling adapter 10 is mated with the connection assembly 4 of the twist-lock coupling-style fuel receiver 2 such that the first lug 5 and second lug 6 engage with the first flange 21 and second flange 22. Once engaged, the first handle 17 and second handle 19 are rotated in a first direction, securing the refueling adapter 10 to the twist-lock coupling-style fuel receiver 2, creating a positive seal against the gasket 18. Conversely, by rotating the first handle 17 and second handle 19 in a second direction, the refueling adapter 10 can be removed from the twist-lock coupling-style fuel receiver 2 to disconnect the fuel dispenser 100 from the vehicle.

Figure 8:
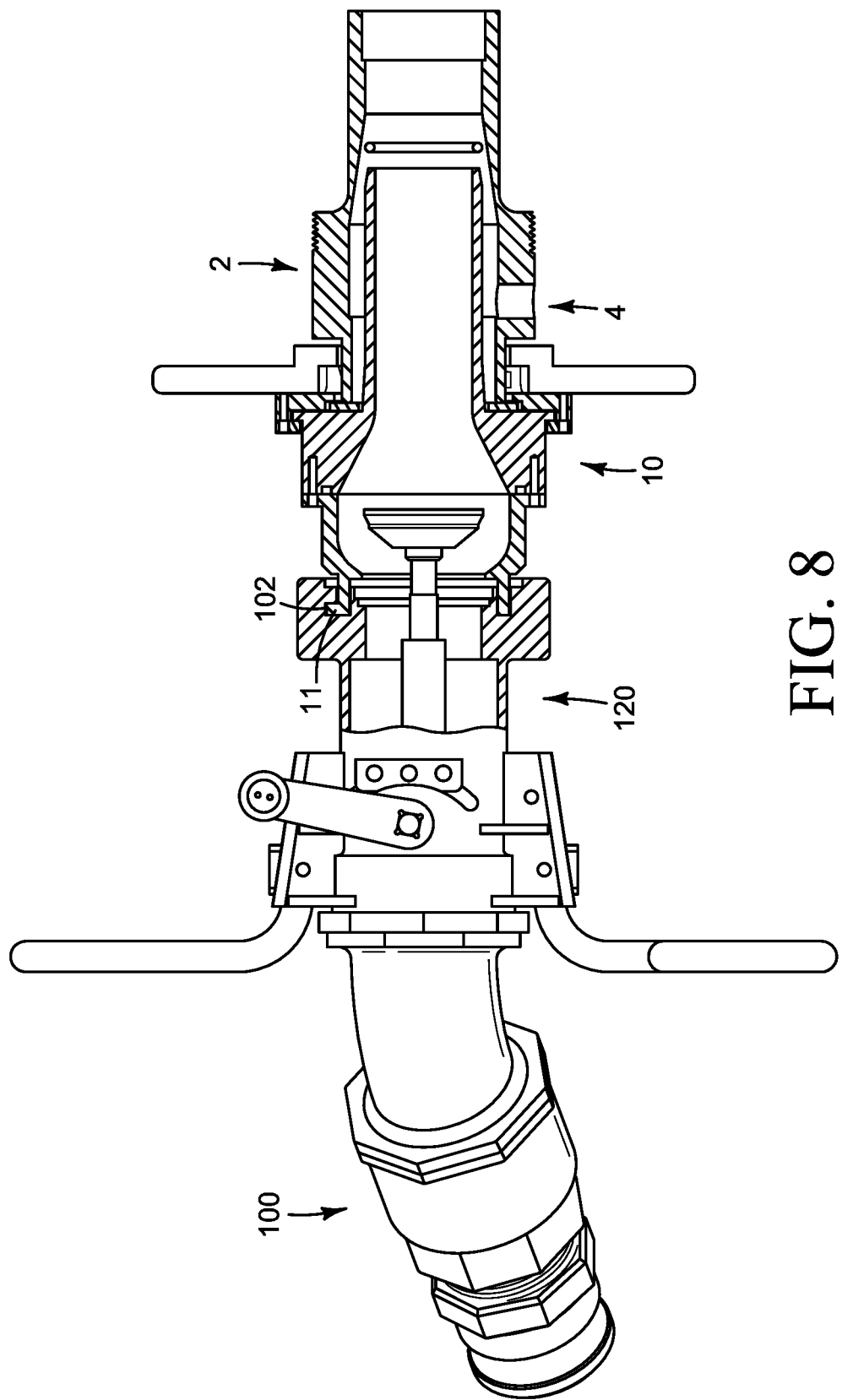
FIG. 8 is an environmental side cross sectional view of the first exemplary refueling adapter after connection.
Figure 9:
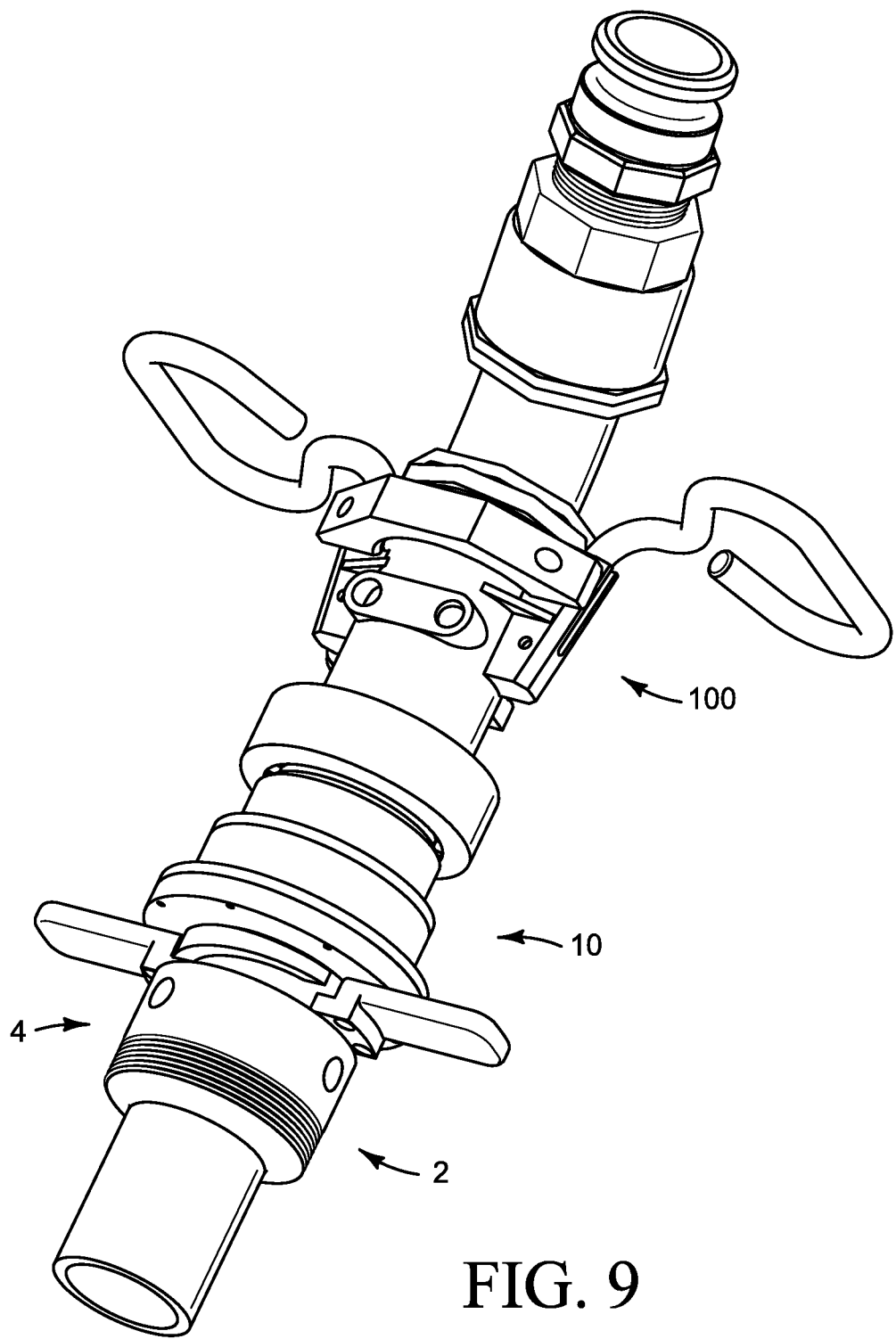
FIG. 9 is an environmental perspective view of the first exemplary refueling adapter after connection.
Figure 10:
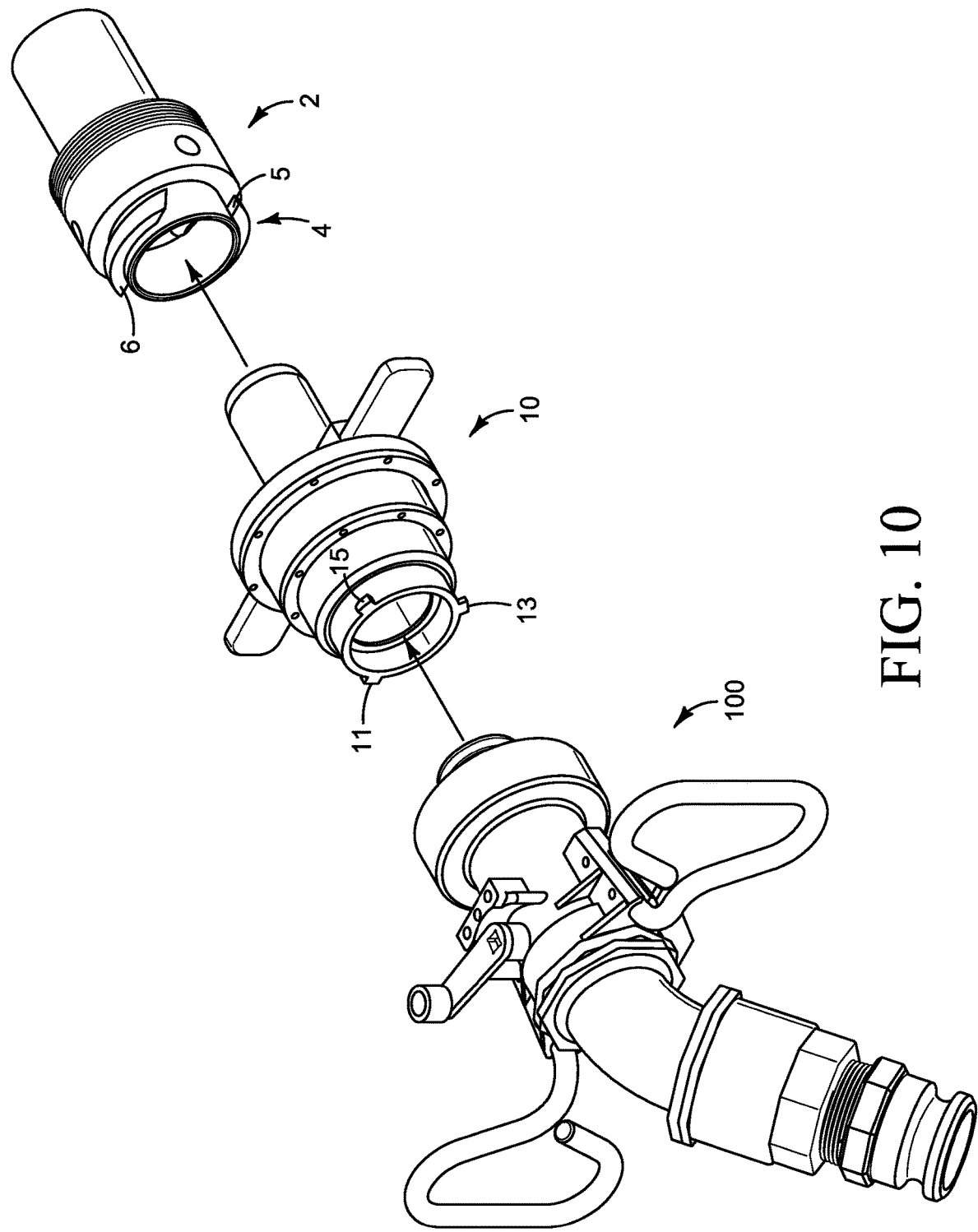
FIG. 10 is a first end environmental perspective view of the first exemplary refueling adapter before connection.
Figure 11:
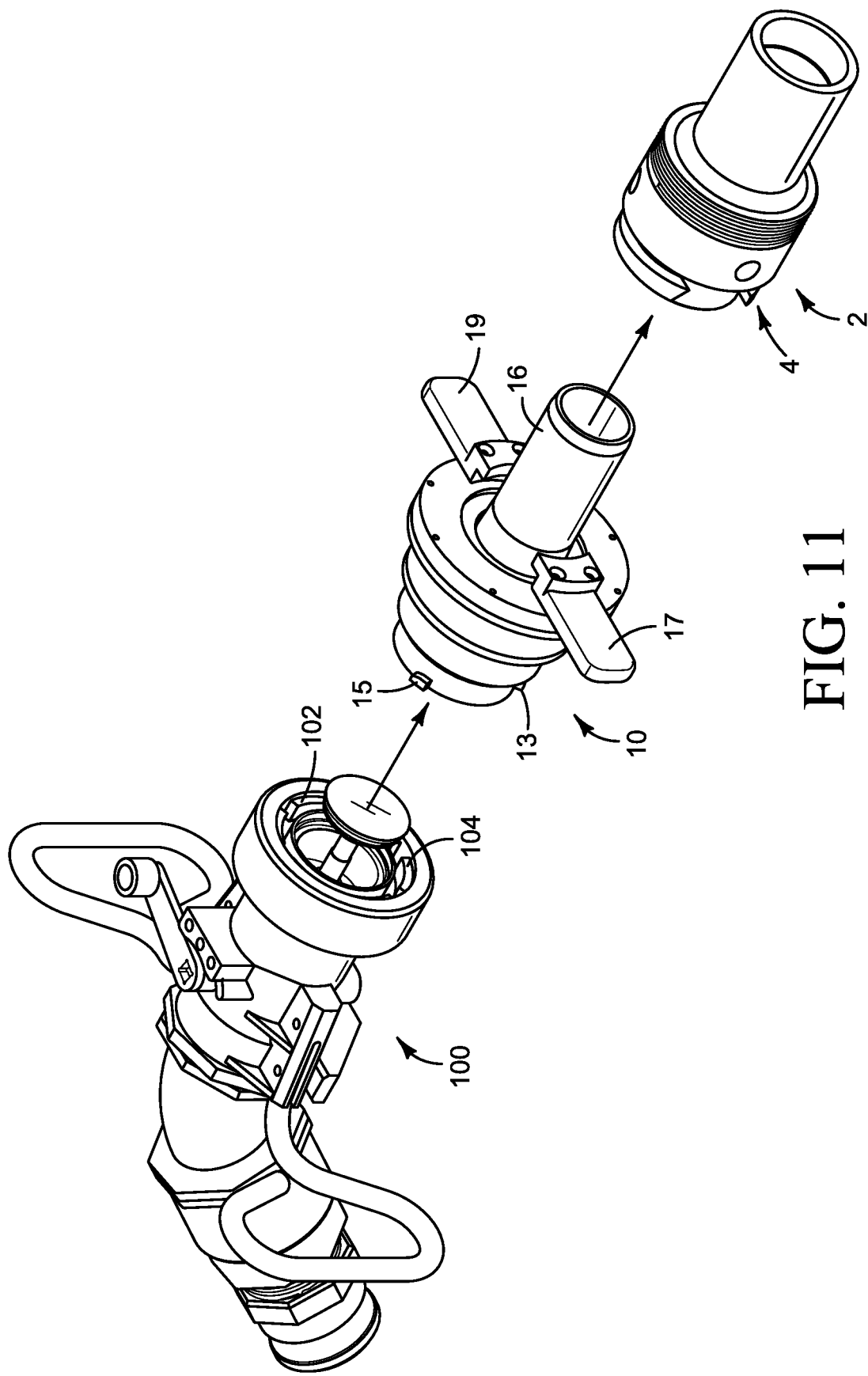
FIG. 11 is a first end environmental view of the first exemplary refueling adapter before connection.
Figure 12:
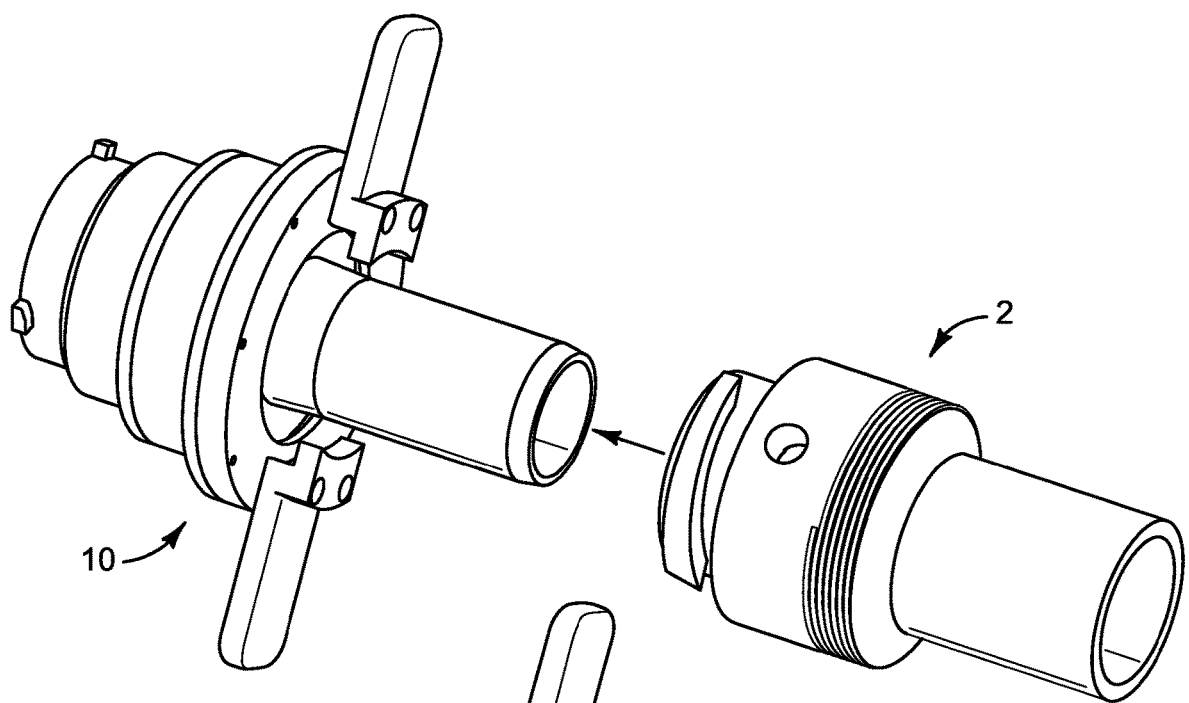
FIG. 12 is a partial environmental view of the first exemplary refueling adapter before connection.
Figure 13:
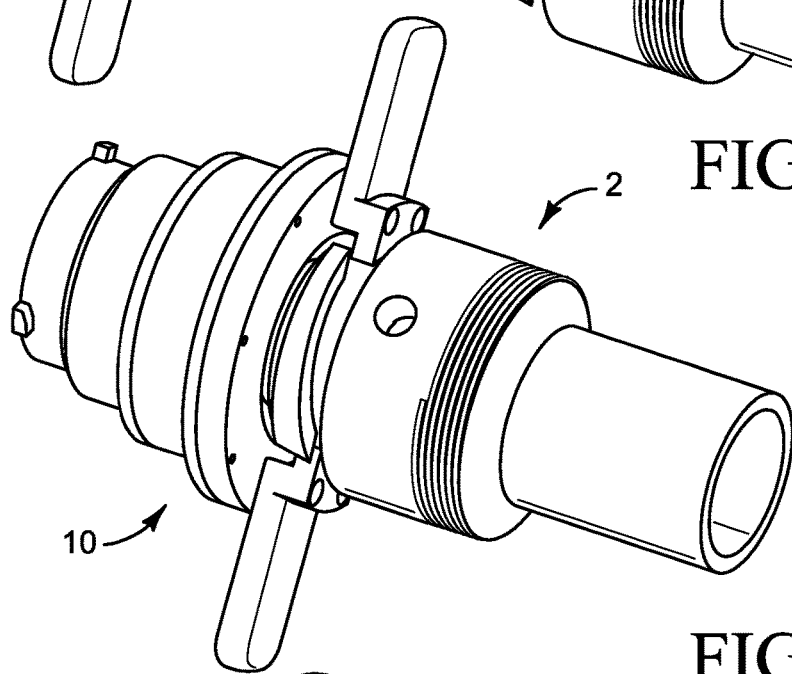
FIG. 13 is a partial environmental view of the first exemplary refueling adapter after connection but before rotation.
Figure 14:
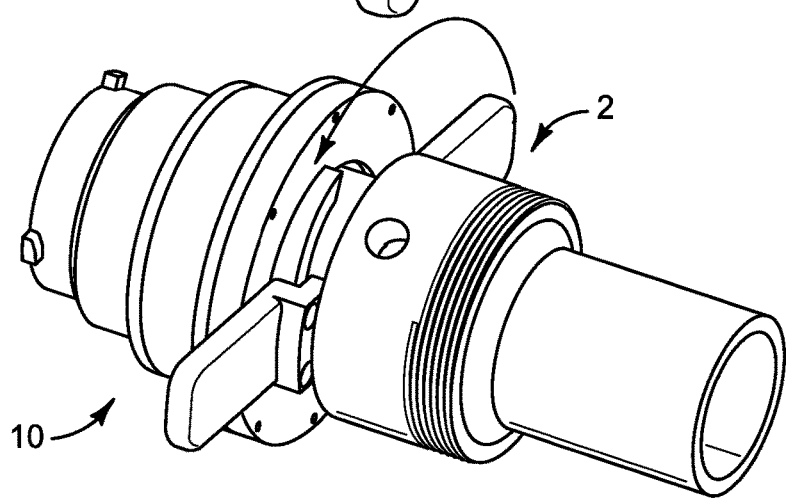
FIG. 14 is a partial environmental view of the first exemplary refueling adapter after connection and after rotation.
Figure 15:
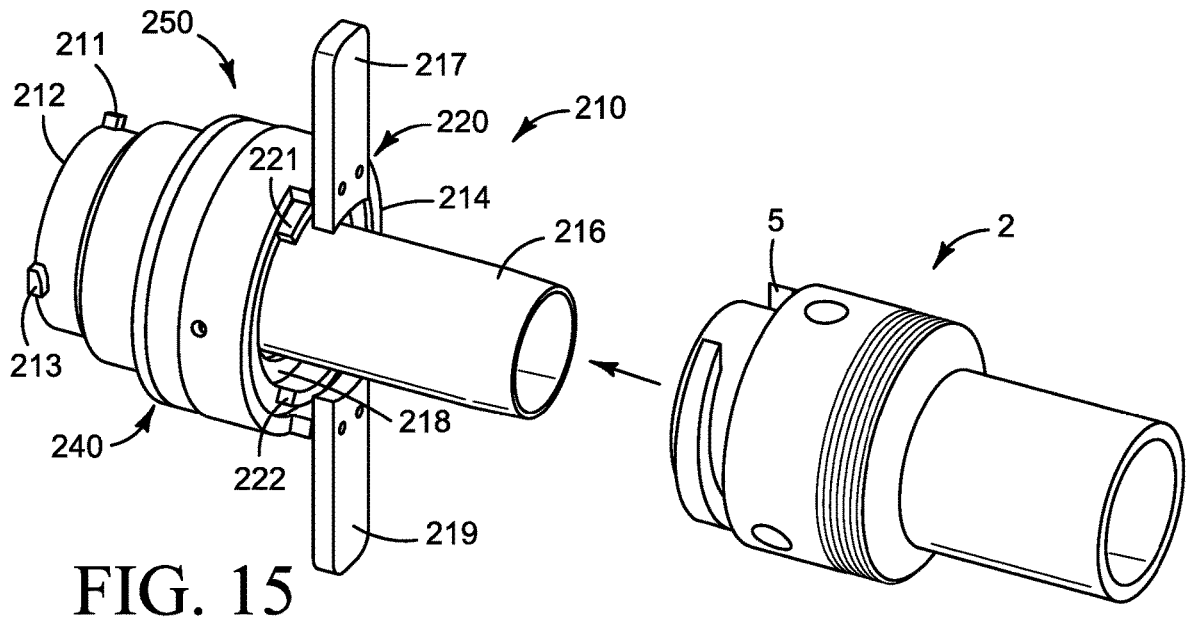
FIG. 15 is a partial environmental view of a second exemplary refueling adapter before connection.
Figure 16:
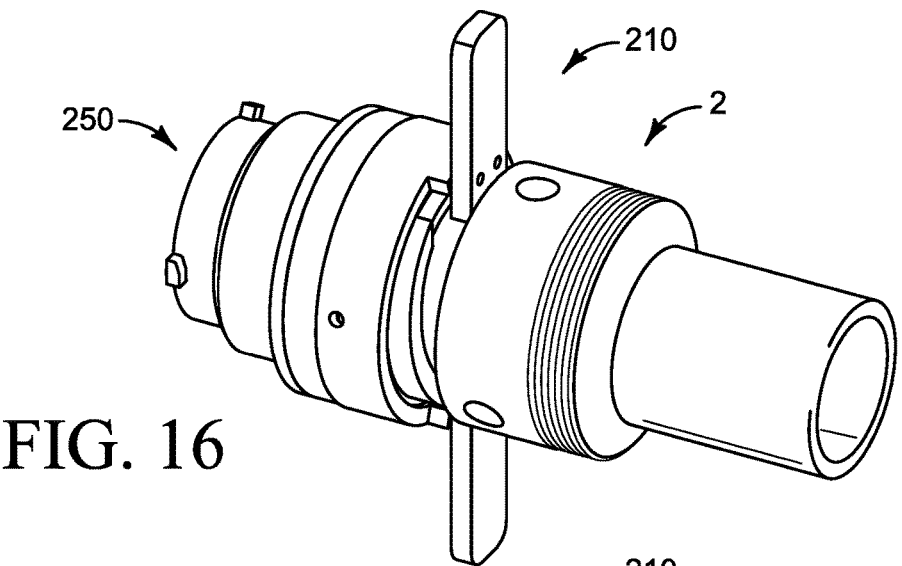
FIG. 16 is a partial environmental view of the second exemplary refueling adapter after connection but before rotation.
Figure 17:
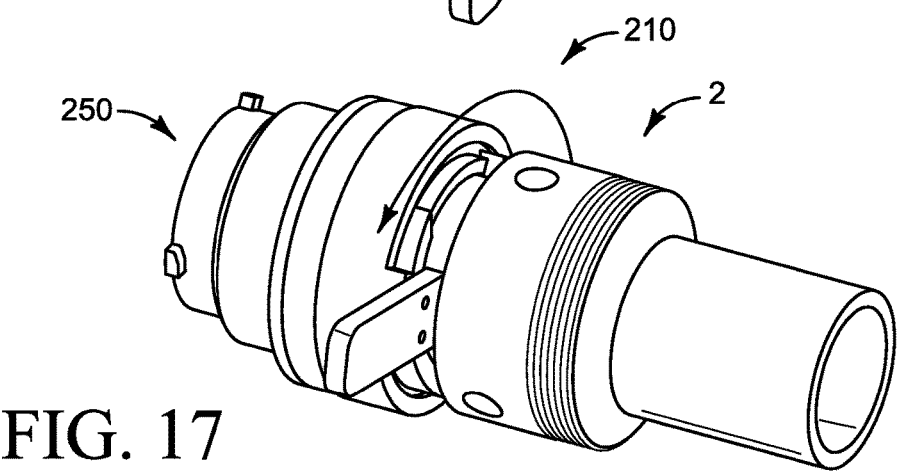
FIG. 17 is a partial environmental view of the second exemplary refueling adapter after connection and after rotation.

Once the refueling adapter 10 has been installed on the twist-lock coupling-style fuel receiver 2, then the refueling adapter 10 would be connected to the dry-break coupling 120 of the fuel dispenser 100 by pressing the dry-break coupling 120 onto the dispenser connector assembly 50 of the refueling adapter 10, and rotating connector of the dry-break coupling 120 in a first direction to enable a positive lock with the refueling adapter 210, thereby allowing allow the dry-break coupling 120 to be opened by the handles of the dry-break coupling 120 being rotated to their open position, as illustrated in FIGS. 8 and 9. Once the dry-break coupling 120 is opened, then fuel can flow from the fuel dispenser 100, through the dry-break coupling 120, through the refueling adapter 10, through the twist-lock coupling-style fuel receiver 2, and into the fuel tank (not illustrated).

Similarly, to disconnect the system, the opposite order is preferably followed. First, the dry-break coupling 120 must be closed by moving the handles of the dry-break coupling 120 to their closed position (illustrated in FIGS. 7, 10 and 11). Once closed, then the dry-break coupling 120 could be disconnected from the refueling adapter 10 by rotating the connector of the dry-break coupling 120 in a second direction. During the rotation, in a second direction, of the connector of the dry-break coupling 120, it is preferred the mating assembly 20 of the refueling adapter 10 does not disconnect from the connection assembly 4 of the twist-lock coupling-style fuel receiver 2, as this would compromise the safety locking aspect of the nozzle 16. Once the dry-break coupling 120 is disconnected from the refueling adapter 10, then the first handle 17 and second handle 19 of the mating assembly 20 could be turned in a second direction, causing the refueling adapter 10 to disengage from the twist-lock coupling-style fuel receiver 2. The refueling adapter 10 could then be lifted off the twist-lock coupling-style fuel receiver 2, withdrawing the nozzle 16 from contact with the internal flapper on the bottom of the twist-lock coupling-style fuel receiver 2, allowing the twist-lock coupling-style fuel receiver 2 to itself close.

The refueling adapter 10 is connected to the twist-lock coupling-style fuel receiver 2. The refueling adapter 10 and twist-lock coupling-style fuel receiver 2 are configured such that the first flange 21 and second flange 22 of the refueling adapter 10 engage a first lug 5 and second lug 6 on the connection assembly 4 of the twist-lock coupling-style fuel receiver 2, thereby allowing the mating assembly 20 to be cammed onto the twist-lock coupling-style fuel receiver 2 at its connection assembly 4. Further, rotation of the first handle 17 and the second handle 19 in a first direction, secures the refueling adapter 10 to twist-lock coupling-style fuel receiver 2, and creates a positive seal against the gasket 18. Conversely, by turning the mating assembly 20 in a second direction, the refueling adapter 10 can be then lifted off the twist-lock coupling-style fuel receiver 2 to disconnect the fuel dispenser 100 from the vehicle.

Additionally, the refueling adapter 10 is connected to the dry-break coupling 120 of the fuel dispenser 100 by pressing the dry-break coupling 120 onto the dispenser connector assembly 50 of the refueling adapter 10, and rotating connector of the dry-break coupling 120 in a first direction to enable a positive lock with the refueling adapter 10, thereby allowing allow the dry-break coupling 120 to be opened and fuel to flow from the fuel dispenser 100, through the dry-break coupling 120, through the refueling adapter 10, through the twist-lock coupling-style fuel receiver 2, and into the fuel tank. When dry-break coupling 120 is engaged with the refueling adapter 10, a leak-proof connection is formed.

Referring now to FIGS. 12 through 19, a second exemplary refueling adapter 210 is illustrated. The second exemplary refueling adapter 210 is similar to the first exemplary refueling adapter 10 illustrated in FIGS. 1 through 11 and described above, except as detailed below.

The refueling adapter 210 is configured for permitting a vehicle having a twist-lock coupling-style fuel receiver 2 to be fueled from a fuel source having a fuel dispenser 100 having a dry-break coupling 120. An exemplary dry-break coupling 120 is partially illustrated in FIGS. 18 and 19. For simplicity, the same fuel dispenser 100, dry-break coupling 120, and L-shaped attachment channels 102 are used in illustrations for both the refueling adapter 10 and the refueling adapter 210.

The refueling adapter 210 comprises a mating assembly 220 and a body portion 240. The body portion 240 comprises a first end 212 and a second end 214. The mating assembly 220 of the refueling adapter is configured for rotatable engagement with the twist-lock coupling-style fuel receiver 2 at its connection assembly 4, thereby allowing allow the dry-break coupling 120 to be opened and fuel to flow from the fuel dispenser 100, through the dry-break coupling 120, through the refueling adapter 210, through the twist-lock coupling-style fuel receiver 2, and into the fuel tank.

The first end 212 comprises a dispenser connector assembly 250. The dispenser connector assembly 250 comprises a first lug 211, a second lug 213 and a third lug (not illustrated). The lugs are configured for interlocking engagement with a plurality of L-shaped attachment channels 102 within the dry-break coupling 120 which enable the refueling adapter 210 to sealing engage the dry-break coupling 120, thereby enabling the fueling dispenser 100 to be connected to the refueling adapter 210 in a manner that ensures a positive seal and no fuel leaks. Preferably, the lugs comprise the three-lug connection interface defined in MS 24484. The dispenser connector assembly 250 is securely attached to the body portion 240 of the refueling adapter 210 to ensure that they are not able to rotate independent of each other.

No dry-break poppet is installed on the refueling adapter 210, but the combined dry-break coupling 120 and fuel dispenser 100 still has a dry-break connection.

Extending from the second end 214 of the body portion 240 of the refueling adapter 210 is a nozzle 216. Preferably, the nozzle 216 has the same general nozzle geometry as a nozzle on a twist-lock coupling-style fuel dispenser (not illustrated). Preferably, the length of the nozzle 216 is generally the same length as a nozzle on a twist-lock coupling-style fuel dispenser in order to open the flapper (not illustrated) on the bottom of the twist-lock coupling-style fuel receiver 2. Despite the preferred nozzle geometry and length, any suitable structure and/or material can be used for the nozzle, and a skilled artisan will be able to select an appropriate structure and material for the nozzle geometry and length in a particular embodiment based on various considerations, including the intended use of the refueling adapter, the intended arena within which the refueling adapter will be used, and the equipment and/or accessories with which the refueling adapter is intended to be used, among other considerations.

The body portion 240, at the second end 214, comprises a gasket 218, preferably comprises rubber, which is configured for sealing the refueling adapter 210 to the twist-lock coupling-style fuel receiver 2. Any suitable structure and/or material can be used for the gasket, and a skilled artisan will be able to select an appropriate structure and material for the gasket in a particular embodiment based on various considerations, including the intended use of the refueling adapter, the intended arena within which the refueling adapter will be used, and the equipment and/or accessories with which the refueling adapter is intended to be used, among other considerations.

The body portion 240 is configured for operative attachment with the twist-lock coupling-style fuel receiver 2 via the mating assembly 220. The mating assembly 220 is rotatably attached to the body portion 240, allowing at least ninety degree rotation in both the first direction and second direction.

The mating assembly 220 is configured to rotate relative to the body portion 240 and the dispenser connector assembly 250. In the exemplary refueling adapter 210 illustrated in these Figures, the body portion 240 comprise a radial race 230 configured for receiving at least one ball bearing 231 adjacent the second end 214. The mating assembly 220 comprises a mating radial race 225 configured for likewise receiving the one or more ball bearings 231, allowing the mating assembly 220 to be rotated relative to the body portion 240. When rotated in a first direction, the mating assembly 220 is capable of rotatable engagement with the twist-lock coupling-style fuel receiver 2. Specifically, the mating assembly 220 rotates relative to the twist-lock coupling-style fuel receiver 2 and engages therewith. Conversely, when rotated in a second direction, the mating assembly 220 is capable of rotatable disengagement with the twist-lock coupling-style fuel receiver 2.

The mating assembly 220 comprises a first handle 217 and a second handle 219. The mating assembly 220 is configured to rotate relative to body portion 240 and the nozzle 216 extending therethrough. The first handle 217 comprises a first flange 221, and the second handle 219 comprises a second flange 222. The first flange 221 and second flange 222 are configured for engaging a first lug 5 and a second lug 6 on the connection assembly 4 of the twist-lock coupling-style fuel receiver 2, thereby allowing the mating assembly 220 to be cammed onto the twist-lock coupling-style fuel receiver 2 at its connection assembly 4. By rotating both the first handle 217 and the second handle 219 in a first direction, the refueling adapter 210 is secured to the twist-lock coupling-style fuel receiver 2, and creates a positive seal against the gasket 218. Likewise, by turning the mating assembly 220 in a second direction, the refueling adapter 210 can be then lifted off the twist-lock coupling-style fuel receiver 2 to disconnect the fuel dispenser 100 from the vehicle.

Alternative connection standards besides MS 24484 could be specified such as a range of API style couplers, cam locks and a range of other dry-break connections for the top of the adapter. Thus, any suitable structure and/or material can be used for the connection standards, and a skilled artisan will be able to select an appropriate structure and material for the connection standards in a particular embodiment based on various considerations, including the intended use of the refueling adapter, the intended arena within which the refueling adapter will be used, and the equipment and/or accessories with which the refueling adapter is intended to be used, among other considerations.

In use, the refueling adapter 210 could be first installed onto the twist-lock coupling-style fuel receiver 2, or could be first installed onto the dry-break coupling 120 of the fuel dispenser 100. A skilled artisan will be able to select an appropriate installation location in a particular embodiment based on various considerations, including the intended use of the refueling adapter, the intended arena within which the refueling adapter will be used, and the equipment and/or accessories with which the refueling adapter is intended to be used, among other considerations.

However, in order to maximize safety it is preferred that the system be connected in a certain order. Namely, that the refueling adapter 210 first be connected to the twist-lock coupling-style fuel receiver 2. Once the refueling adapter 210 has been installed on the twist-lock coupling-style fuel receiver 2, then the refueling adapter 210 would be connected to the dry-break coupling 120 of the fuel dispenser 100 by pressing the dry-break coupling 120 onto the dispenser connector assembly 250 of the refueling adapter 210, and rotating connector of the dry-break coupling 120 in a first direction to enable a positive lock with the refueling adapter 210, thereby allowing allow the dry-break coupling 120 to be opened and fuel to flow from the fuel dispenser 100, through the dry-break coupling 120, through the refueling adapter 210, through the twist-lock coupling-style fuel receiver 2, and into the fuel tank.

Similarly, to disconnect the system, the opposite order is preferably followed. First, the dry-break coupling 120 must be closed. Once closed, then the dry-break coupling 120 could be disconnected from the refueling adapter 210 by rotating the connector of the dry-break coupling 120 in a second direction. During the rotation, in a second direction, of the connector of the dry-break coupling 120, it is preferred the mating assembly 220 of the refueling adapter 210 does not disconnect from the connection assembly 4 of the twist-lock coupling-style fuel receiver 2, as this would compromise the safety locking aspect of the nozzle. Once the dry-break coupling 120 is disconnected from the refueling adapter 210, then the handles of the mating assembly 220 could be turned in a second direction, causing the refueling adapter 210 to disengage from the twist-lock coupling-style fuel receiver 2. The refueling adapter 210 could then be lifted off the twist-lock coupling-style fuel receiver 2, withdrawing the nozzle 216 from contact with the internal flapper on the bottom of the twist-lock coupling-style fuel receiver 2, allowing the twist-lock coupling-style fuel receiver 2 to close.

Figure 18:
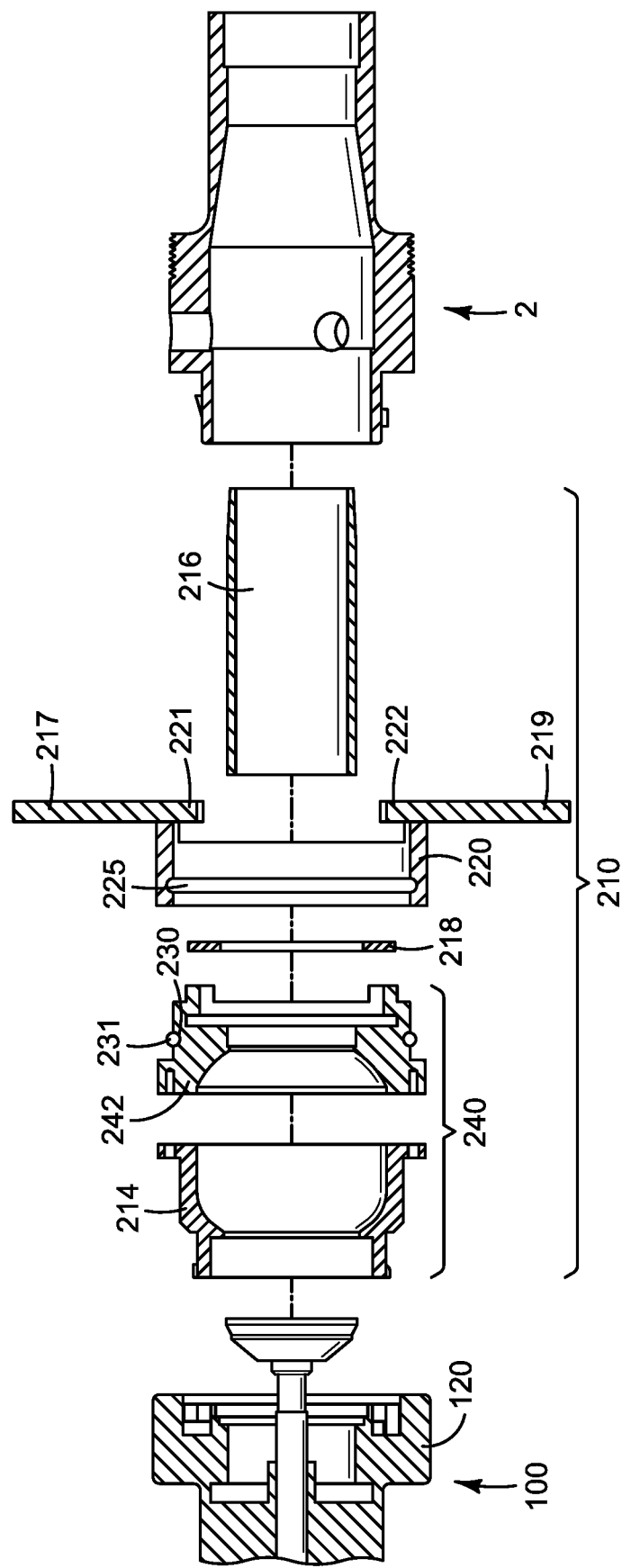
FIG. 18 is a partial, exploded environmental side cross sectional view of the second exemplary refueling adapter before connection.
Figure 19:
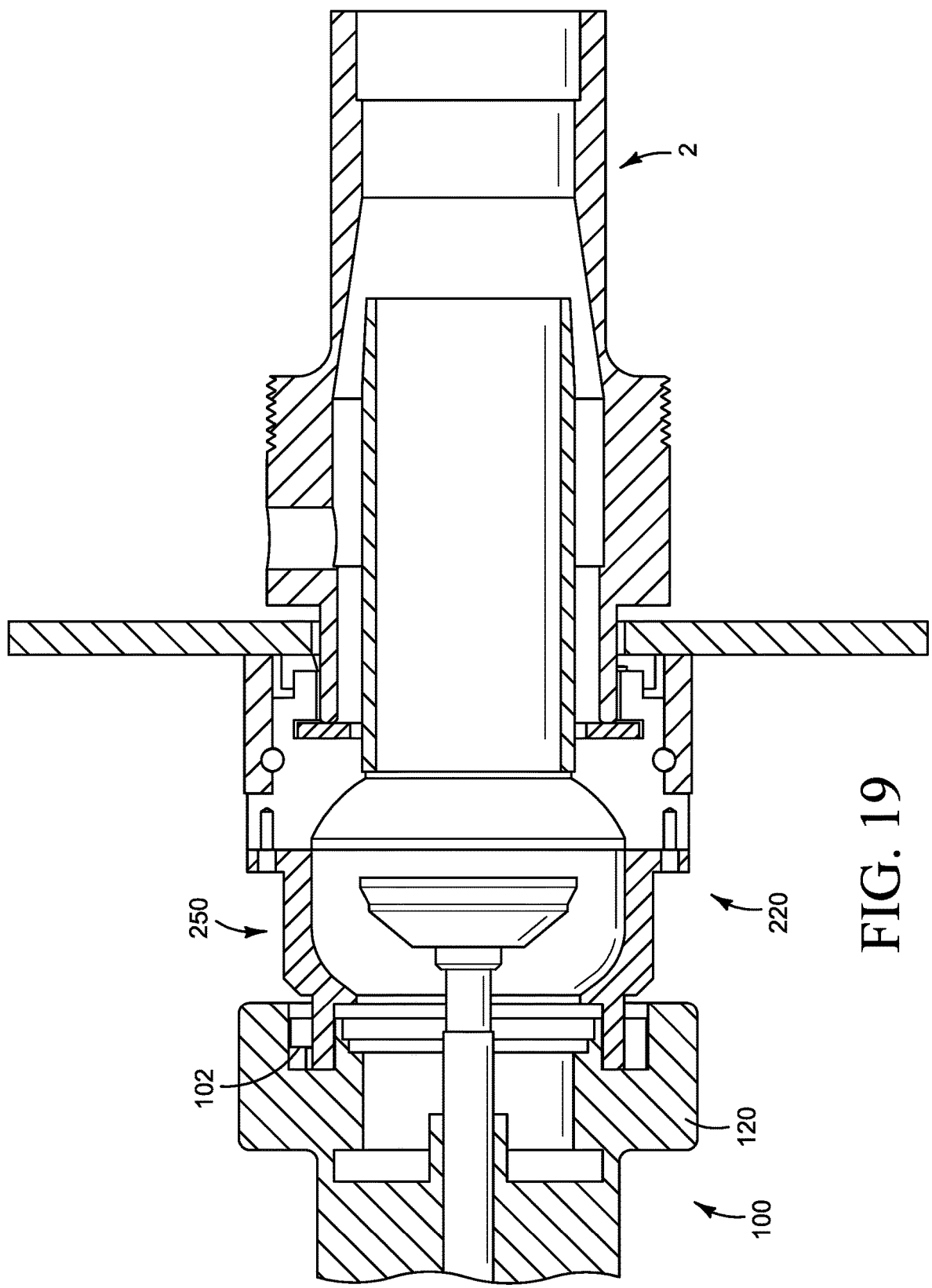
FIG. 19 is a partial environmental side cross sectional view of the second exemplary refueling adapter.
Figure 20:
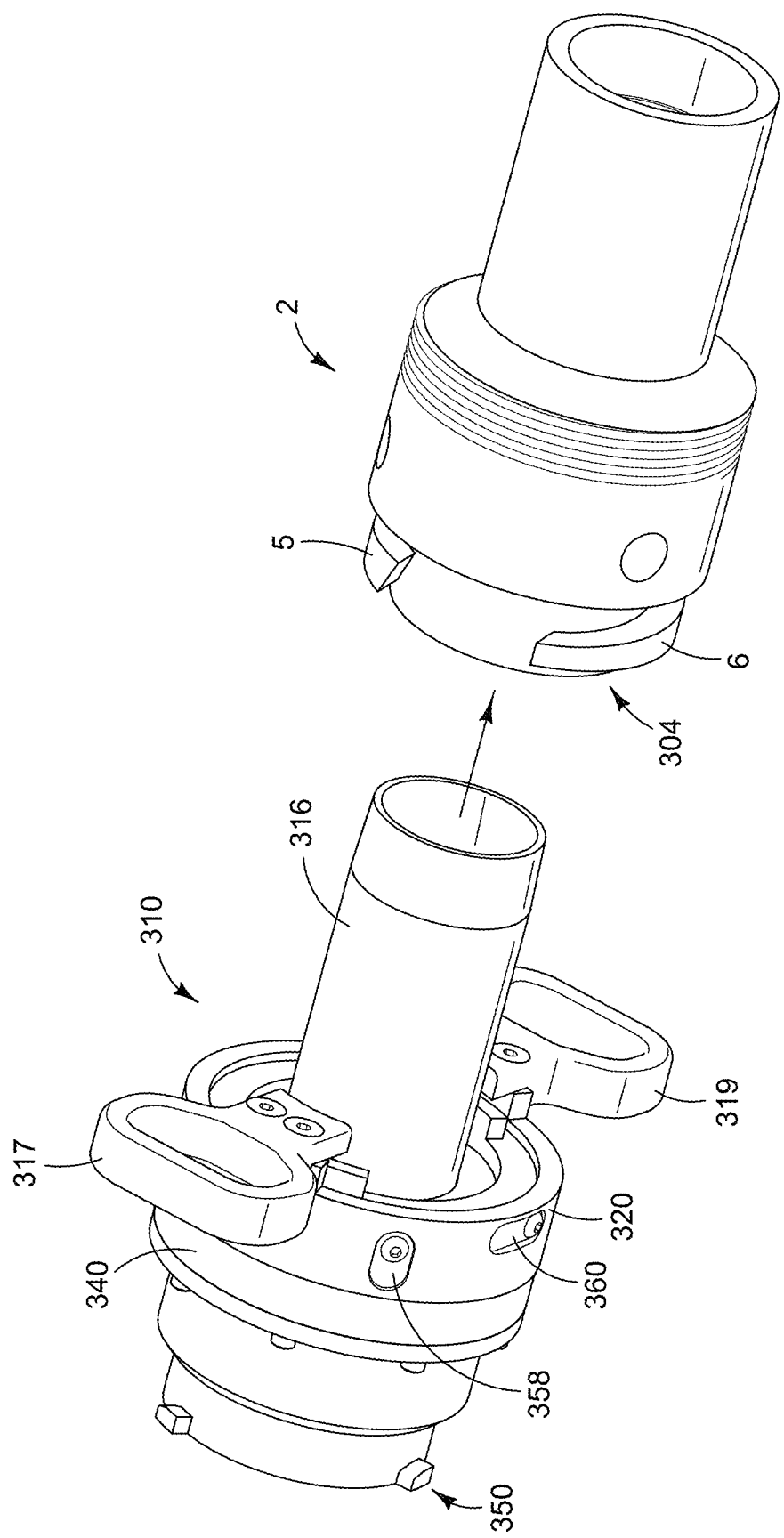
FIG. 20 is a partial environmental view of the third exemplary refueling adapter before connection.

FIGS. 18 and 19 illustrate engagement of the fuel dispenser 100, refueling adapter 210, and twist-lock coupling-style fuel receiver 2, specifically, an exemplary dry-break coupling 120 between the fuel dispenser 100 and refueling adapter 210.

The refueling adapter 210 is connected to the twist-lock coupling-style fuel receiver 2. The refueling adapter 210 and twist-lock coupling-style fuel receiver 2 are configured such that the first flange 221 and second flange 222 of the refueling adapter 210 engage a first lug 5 and second lug 6 on the connection assembly 4 of the twist-lock coupling-style fuel receiver 2, thereby allowing the mating assembly 220 to be cammed onto the twist-lock coupling-style fuel receiver 2 at its connection assembly 4. Further, rotation of the first handle 217 and the second handle 219 in a first direction secures the refueling adapter 210 to twist-lock coupling-style fuel receiver 2, and creates a positive seal against the gasket 218. Conversely, by turning the mating assembly 220 in a second direction, the refueling adapter 210 can be then lifted off the twist-lock coupling-style fuel receiver 2 to disconnect the fuel dispenser 100 from the vehicle.

Additionally, the refueling adapter 210 is connected to the dry-break coupling 120 of the fuel dispenser 100 by pressing the dry-break coupling 120 onto the dispenser connector assembly 250 of the refueling adapter 210, and rotating connector of the dry-break coupling 120 in a first direction to enable a positive lock with the refueling adapter 210, thereby allowing allow the dry-break coupling 120 to be opened and fuel to flow from the fuel dispenser 100, through the dry-break coupling 120, through the refueling adapter 210, through the twist-lock coupling-style fuel receiver 2, and into the fuel tank. When dry-break coupling 120 is engaged with the refueling adapter 210, a leak-proof connection is formed.

Referring now to FIGS. 20 through 24, a third exemplary refueling adapter 310 is illustrated. The third exemplary refueling adapter 310 is similar to the first and second exemplary refueling adapters illustrated in FIGS. 1 through 19 and described above, except as detailed below.

The refueling adapter 310 is configured for permitting a vehicle having a twist-lock coupling-style fuel receiver 2 to be fueled from a fuel source having a fuel dispenser 100 having a dry-break coupling 120. An exemplary dry-break coupling 120 is partially illustrated in FIGS. 21 and 22.

Figure 21:
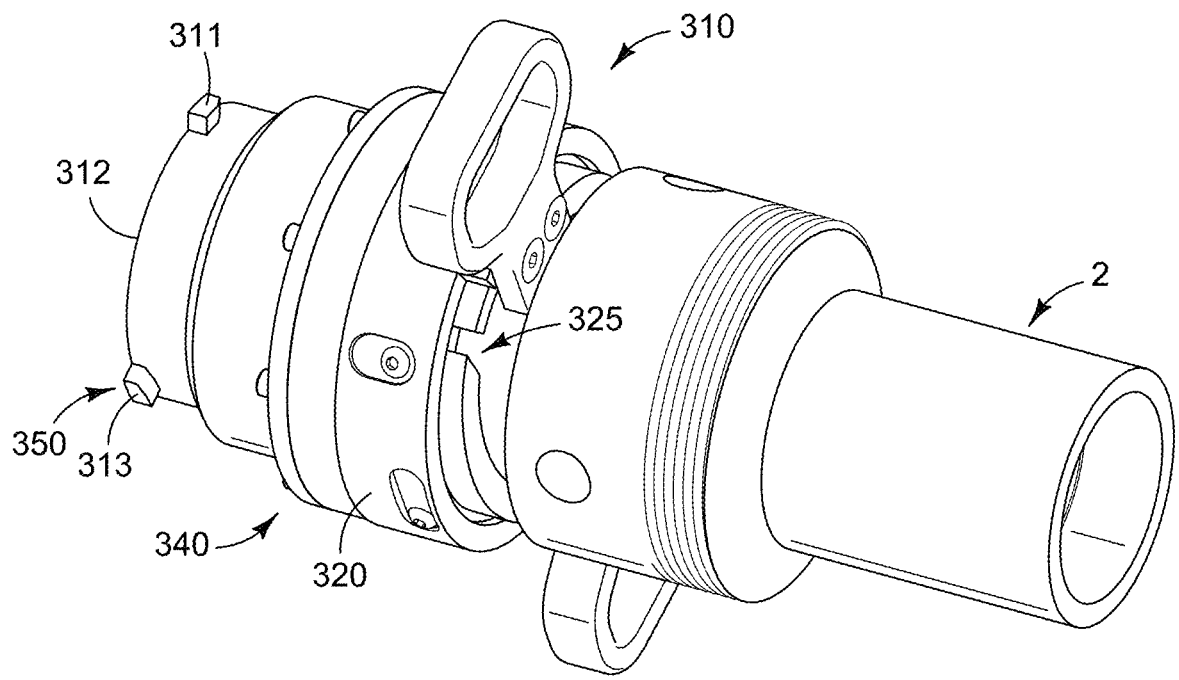
FIG. 21 is a partial environmental view of the third exemplary refueling adapter after connection but before rotation.
Figure 22:
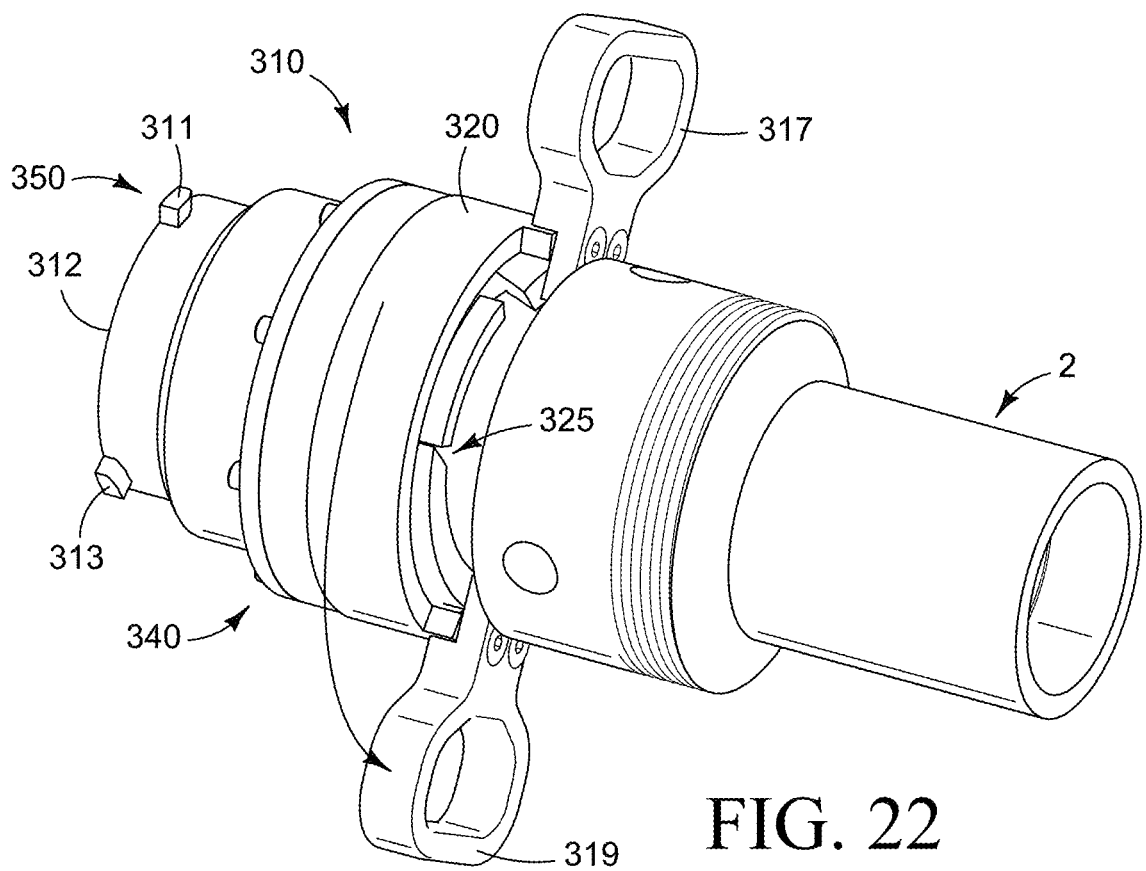
FIG. 22 is a partial environmental view of the third exemplary refueling adapter after connection and after rotation.

The refueling adapter 310 comprises a mating assembly 320 and a body portion 340. The body portion 340 comprises a first end 312 and a second end 314. The body portion 340 includes a first portion 342 connected to a second portion 344. An o-ring 323 is sealing placed between the first portion 342 and the second portion 344. The second portion 344 having an outer surface 346. Extending about the outer surface 346 is a radial race 362. As illustrated in FIGS. 21 and 22, the mating assembly 320 of the refueling adapter is a twist-lock coupling-style connector 325 configured for rotatable engagement with the twist-lock coupling-style fuel receiver 2 at its connection assembly 304, thereby allowing allow the dry-break coupling 120 to be opened and fuel to flow from the fuel dispenser 100, through the dry-break coupling 120, through the refueling adapter 310, through the twist-lock coupling-style fuel receiver 2, and into the fuel tank.

The first end 312 comprises a dispenser connector assembly 350 for connecting with the dry-break coupling 120. The dispenser connector assembly 350 comprises a first lug 311, a second lug 313 and a third lug (not illustrated). The lugs are configured for interlocking engagement with a plurality of L-shaped attachment channels 102 within the dry-break coupling 120 which enable the refueling adapter 310 to sealing engage the dry-break coupling 120, thereby enabling the fueling dispenser 300 to be connected to the refueling adapter 310 in a manner that ensures a positive seal and no fuel leaks. Preferably, the lugs comprise the three-lug connection interface defined in MS 24484. The dispenser connector assembly 350 is securely attached to the body portion 340 of the refueling adapter 310 to ensure that they are not able to rotate independent of each other.

No dry-break poppet is installed on the refueling adapter 310, but the combined dry-break coupling 120 and fuel dispenser 100 still has a dry-break connection.

Extending from the second end 314 of the body portion 340 of the refueling adapter 310 is a nozzle 316. Preferably, the nozzle 316 has the same general nozzle geometry as a nozzle on a twist-lock coupling-style fuel dispenser (not illustrated). Preferably, the length of the nozzle 316 is generally the same length as a nozzle on a twist-lock coupling-style fuel dispenser in order to open the flapper (not illustrated) on the bottom of the twist-lock coupling-style fuel receiver 2. Despite the preferred nozzle geometry and length, any suitable structure and/or material can be used for the nozzle, and a skilled artisan will be able to select an appropriate structure and material for the nozzle geometry and length in a particular embodiment based on various considerations, including the intended use of the refueling adapter, the intended arena within which the refueling adapter will be used, and the equipment and/or accessories with which the refueling adapter is intended to be used, among other considerations.

Additionally the mating assembly 320 possesses an outer surface 324 and an inner surface 327. Extending about the inner surface 327 is an outer race 364. The mating assembly 320 is configured for receipt onto the body portion 340. When the mating assembly 320 is so installed on the body portion 340, the inner radial race 362 of the body portion 340 aligns with the outer radial race 364 of the mating assembly 320 to define a radial race 330 configured for receiving a plurality of ball bearings 331 therein. Further, extending through the outer surface 324 is a first insertion point 354, the first insertion point 354 for receiving ball bearings 331. In addition to the first insertion point 354, the outer surface 324 contains a second insertion point 356 for a single ball bearing 331, the single ball bearing 331 serving as a detent stop for when the first handle 317 and second handle 319 are properly aligned. Once a single ball bearing 331 is inserted in the second insertion point 356, the second insertion point 356 is covered by a cap 360. The cap 360 is configured such that it applies a load upon the ball bearing 331. The cap 360, preferably, is made from spring steel and applies a load, in a first direction, upon the ball bearing 331.

The mating assembly 320 is configured such that, when engaged with the body portion 340, a user can insert a plurality of ball bearings 331 into the first insertion point 354. When inserted, the ball bearings 331 fit within the radial race 330 such that the bearings 331 can rotate and slide within. This configuration, preferably, is achieved through the presence of a first groove 362 on the body portion 340 and a second groove 364 on the mating assembly 320. The first groove 362 is an inner race and the second groove 364 is an outer race of the radial race 330. The first groove 362 and second groove 364 are, preferably, configured such that when the first handle 317 and second handle 319 are aligned, the ball bearings 331 inserted through the first insertion point 354 are held in the first groove 362 and second groove 364. This configuration, ultimately, serves as a stop such that the operator can install the refueling adapter properly. The radial race 330 is configured, however, such that the ball bearings 331 cannot inadvertently escape; the ball bearings 331 can only enter or exit the radial race 330 through the first insertion point 354.

Once an appropriate number of ball bearings 331 have been inserted into the radial race 330 through the first insertion point 354, the first insertion point 354 is covered by a first cap 358. The first cap 358 prevents ball bearings 331 from exiting the radial race 330.

The body portion 340, at the second end 314, comprises a gasket 318, preferably comprises rubber, which is configured for sealing the refueling adapter 310 to the twist-lock coupling-style fuel receiver 2. Any suitable structure and/or material can be used for the gasket, and a skilled artisan will be able to select an appropriate structure and material for the gasket in a particular embodiment based on various considerations, including the intended use of the refueling adapter, the intended arena within which the refueling adapter will be used, and the equipment and/or accessories with which the refueling adapter is intended to be used, among other considerations.

The body portion 340 is configured for operative attachment with the twist-lock coupling-style fuel receiver 2 via the mating assembly 320. The mating assembly 320 is rotatably attached to the body portion 340, allowing at least ninety degree rotation in both the first direction and second direction via the ball bearings 331.

The mating assembly 320 is configured to rotate relative to the body portion 340 and the dispenser connector assembly, via the ball bearings 331. In the exemplary refueling adapter 310 illustrated in these Figures, the mating assembly 320 comprises a radial race 330 configured for receiving the plurality ball bearings 331, allowing the mating assembly 320 to be rotated relative to the body portion 340. When rotated in a first direction, the mating assembly 320 is capable of rotatable engagement with the twist-lock coupling-style fuel receiver 2. Specifically, the mating assembly 320 rotates relative to the twist-lock coupling-style fuel receiver 2 and engages therewith. Conversely, when rotated in a second direction, the mating assembly 320 is capable of rotatable disengagement with the twist-lock coupling-style fuel receiver 2.

The mating assembly 320 includes a twist-lock coupling-style connector 325 for engaging the twist-lock coupling-style fuel receiver 2. The twist-lock coupling-style connector 325 of the mating assembly 320 comprises a first handle 317 and a second handle 319. The mating assembly 320 is configured to rotate relative to body portion 340 and the nozzle 316 extending therethrough. The first handle 317 comprises a first flange 321, and the second handle 319 comprises a second flange 322. The first flange 321 and second flange 322 are configured for engaging a first lug 5 and a second lug 6 on the connection assembly 304 of the twist-lock coupling-style fuel receiver 2, thereby allowing the mating assembly 320 to be cammed onto the twist-lock coupling-style fuel receiver 2 at its connection assembly 304. By rotating both the first handle 317 and the second handle 319 in a first direction, the refueling adapter 310 is secured to the twist-lock coupling-style fuel receiver 2, and creates a positive seal against the gasket 318. Likewise, by turning the twist-lock coupling-style connector 325 of the mating assembly 320 in a second direction, the refueling adapter 310 can be then lifted off the twist-lock coupling-style fuel receiver 2 to disconnect the fuel dispenser 100 from the vehicle.

Alternative connection standards besides MS 24484 could be specified such as a range of API style couplers, cam locks and a range of other dry-break connections for the top of the adapter. Thus, any suitable structure and/or material can be used for the connection standards, and a skilled artisan will be able to select an appropriate structure and material for the connection standards in a particular embodiment based on various considerations, including the intended use of the refueling adapter, the intended arena within which the refueling adapter will be used, and the equipment and/or accessories with which the refueling adapter is intended to be used, among other considerations.

In use, the refueling adapter 310 could be first installed onto the twist-lock coupling-style fuel receiver 2, or could be first installed onto the dry-break coupling 120 of the fuel dispenser 100. A skilled artisan will be able to select an appropriate installation location in a particular embodiment based on various considerations, including the intended use of the refueling adapter, the intended arena within which the refueling adapter will be used, and the equipment and/or accessories with which the refueling adapter is intended to be used, among other considerations.

However, in order to maximize safety it is preferred that the system be connected in a certain order. Namely, that the refueling adapter 310 first be connected to the twist-lock coupling-style fuel receiver 2. Once the refueling adapter 310 has been installed on the twist-lock coupling-style fuel receiver 2, then the refueling adapter 310 would be connected to the dry-break coupling 120 of the fuel dispenser 100 by pressing the dry-break coupling 120 onto the dispenser connector assembly of the refueling adapter 310, and rotating connector of the dry-break coupling 120 in a first direction to enable a positive lock with the refueling adapter 310, thereby allowing allow the dry-break coupling 120 to be opened and fuel to flow from the fuel dispenser 100, through the dry-break coupling 120, through the refueling adapter 310, through the twist-lock coupling-style fuel receiver 2, and into the fuel tank.

Similarly, to disconnect the system, the opposite order is preferably followed. First, the dry-break coupling 120 must be closed. Once closed, then the dry-break coupling 120 could be disconnected from the refueling adapter 310 by rotating the connector of the dry-break coupling 120 in a second direction. During the rotation, in a second direction, of the connector of the dry-break coupling 120, it is preferred the mating assembly 320 of the refueling adapter 310 does not disconnect from the connection assembly 304 of the twist-lock coupling-style fuel receiver 2, as this would compromise the safety locking aspect of the nozzle. Once the dry-break coupling 120 is disconnected from the refueling adapter 310, then the handles of the mating assembly 320 could be turned in a second direction, causing the refueling adapter 310 to disengage from the twist-lock coupling-style fuel receiver 2. The refueling adapter 310 could then be lifted off the twist-lock coupling-style fuel receiver 2, withdrawing the nozzle 316 from contact with the internal flapper on the bottom of the twist-lock coupling-style fuel receiver 2, allowing the twist-lock coupling-style fuel receiver 2 to close.

Figure 25:
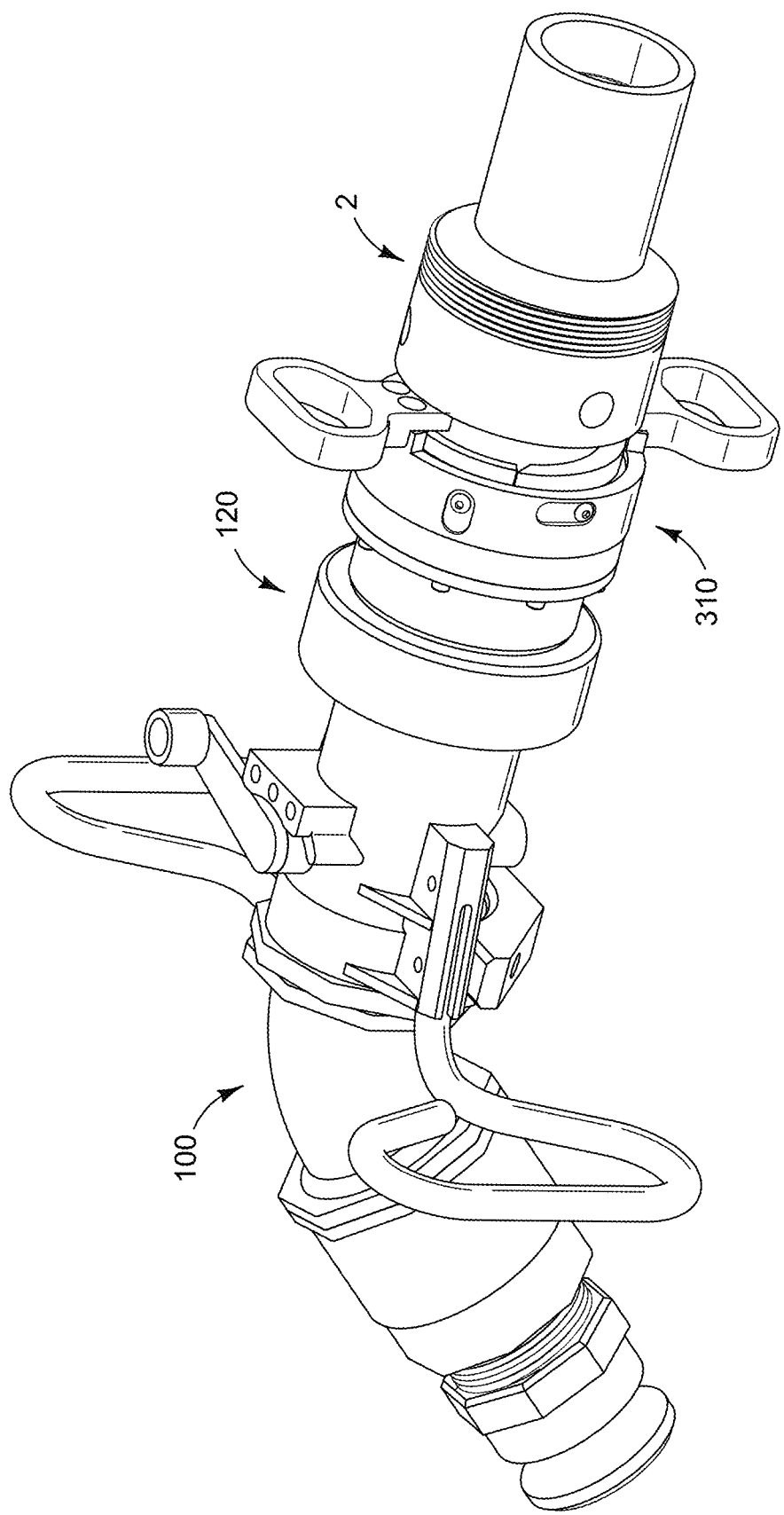
FIG. 25 is an environmental perspective view of the third exemplary refueling adapter after connection.

FIG. 25 illustrates engagement of the fuel dispenser 100, refueling adapter 310, and twist-lock coupling-style fuel receiver 2, specifically, an exemplary dry-break coupling 120 between the fuel dispenser 100 and refueling adapter 310.

The refueling adapter 310 is connected to the twist-lock coupling-style fuel receiver 2. The refueling adapter 310 and twist-lock coupling-style fuel receiver 2 are configured such that the first flange 321 and second flange 322 of the refueling adapter 310 engage a first lug 5 and second lug 6 on the connection assembly 304 of the twist-lock coupling-style fuel receiver 2, thereby allowing the mating assembly 220 to be cammed onto the twist-lock coupling-style fuel receiver 2 at its connection assembly 304. Further, rotation of the first handle 317 and the second handle 319 in a first direction secures the refueling adapter 310 to twist-lock coupling-style fuel receiver 2, and creates a positive seal against the gasket 318. Conversely, by turning the mating assembly 320 in a second direction, the refueling adapter 310 can be then lifted off the twist-lock coupling-style fuel receiver 2 to disconnect the fuel dispenser 100 from the vehicle.

Additionally, the refueling adapter 310 is connected to the dry-break coupling 120 of the fuel dispenser 100 by pressing the dry-break coupling 120 onto the dispenser connector assembly of the refueling adapter 310, and rotating connector of the dry-break coupling 120 in a first direction to enable a positive lock with the refueling adapter 310, thereby allowing allow the dry-break coupling 120 to be opened and fuel to flow from the fuel dispenser 100, through the dry-break coupling 120, through the refueling adapter 310, through the twist-lock coupling-style fuel receiver 2, and into the fuel tank. When dry-break coupling 120 is engaged with the refueling adapter 310, a leak-proof connection is formed.

It is noted that all structure and features of the various described and illustrated embodiments can be combined in any suitable configuration for inclusion in a refueling adapter according to a particular embodiment.

Any suitable materials can be used to form the various components of the refueling adapter, and a skilled artisan will be able to select appropriate materials for a refueling adapter according to a particular embodiment based on various considerations, including the industry within which the refueling adapter is intended to be used, the environment within which the refueling adapter is intended to be used, and the equipment with which the refueling adapter is intended to be used.

The inventor has determined that conventional polymeric and metal materials are suitable for use in the various components of the refueling adapter. Materials hereinafter discovered and/or developed that are determined to be suitable for use in refueling devices would also be considered suitable for use in a refueling adapter according to a particular embodiment.

Still other features and advantages of the disclosed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred and example embodiments are to be regarded as illustrative in nature, and not as restrictive in nature.

While there is shown and described the present preferred embodiment(s) of the inventive concept(s), it is to be distinctly understood that this inventive concept(s) is not limited thereto but may be variously embodied to practice within the scope of this disclosure. From the foregoing description, it will be apparent that various changes may be made without departing from the spirit and scope of the inventive concept(s) as defined herein.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

What is claimed is:

1. A refueling adapter configured for permitting a vehicle having a twist-lock coupling-style fuel receiver fluidly connected to a fuel tank to be fueled from a fuel source having a dry-break coupling-style fuel dispenser, the refueling adapter comprising:

a body portion defining a fuel passageway therethrough, said body portion comprising a first end comprising a dispenser connector assembly, said dispenser connector assembly configured for rotatable engagement with said dry-break coupling-style fuel dispenser; and a mating assembly attached to the body portion, said mating assembly comprising a twist-lock coupling-style connector, said twist-lock coupling-style connector configured for rotatable engagement with said twist-lock coupling-style fuel receiver, wherein said mating assembly comprises at least one flange configured for engaging at least one receiver lug defined on the twist-lock coupling-style fuel receiver, thereby allowing the mating assembly to be cammed onto the twist-lock coupling-style fuel receiver, wherein when said body portion is connected to said dispenser connector assembly and said mating assembly is connected to said twist-lock coupling-style connector, fuel is permitted to flow from the fuel source, through the dry-break coupling-style fuel dispenser, through the refueling adapter, through the twist-lock coupling-style fuel receiver, and into said fuel tank.

2. The refueling adapter of claim 1, wherein said mating assembly is rotatably attached said body portion.

3. The refueling adapter of claim 2, wherein the body portion comprises a second end and a radial flange at or adjacent said second end, and wherein said mating assembly comprises an engagement portion configured for engaging said radial flange, thereby allowing said mating assembly to be rotated relative to said body portion.

4. The refueling adapter of claim 3, wherein the radial flange comprises a radial race configured for receiving at least one ball bearing, and wherein said mating assembly comprises a mating radial race configured for receiving at least one ball bearing.

5. The refueling adapter of claim 2, wherein said mating assembly comprises at least one handle configured for permitting a user to rotate the mating assembly in a first direction and a second direction relative to said body portion.

6. The refueling adapter of claim 1, wherein said body portion comprises a second end, said second end comprising a nozzle configured for opening a flapper within said twist-lock coupling-style fuel receiver.

7. The refueling adapter of claim 1, wherein the dispenser connector assembly comprises at least one lug configured for interlocking engagement with a first L-shaped attachment channel within the dry-break coupling-style fuel dispenser, thereby allowing the mating assembly to be cammed onto the dry-break coupling-style fuel dispenser.

8. The refueling adapter of claim 1, wherein said mating assembly is rotatably attached said body portion, and wherein the body portion comprises a second end and a radial flange at or adjacent said second end, and wherein said mating assembly comprises an engagement portion configured for engaging said radial flange, thereby allowing said mating assembly to be rotated relative to said body portion.

9. The refueling adapter of claim 8, wherein the radial flange comprises a radial race configured for receiving at least one ball bearing, and wherein said mating assembly comprises a mating radial race configured for receiving at least one ball bearing.

10. The refueling adapter of claim 1, wherein said mating assembly is rotatably attached said body portion, and wherein the body portion comprises a second end and a radial flange at or adjacent said second end, and wherein said mating assembly comprises an engagement portion configured for engaging said radial flange, thereby allowing said mating assembly to be rotated relative to said body portion, and wherein the radial flange comprises a radial race configured for receiving at least one ball bearing, and wherein said mating assembly comprises a mating radial race configured for receiving at least one ball bearing.

11. The refueling adapter of claim 1, wherein said mating assembly is rotatably attached said body portion, wherein the body portion comprises a second end and a radial flange at or adjacent said second end, and wherein said mating assembly comprises an engagement portion configured for engaging said radial flange, thereby allowing said mating assembly to be rotated relative to said body portion, wherein the radial flange comprises a radial race configured for receiving at least one ball bearing, and wherein said mating assembly comprises a mating radial race configured for receiving at least one ball bearing, and wherein said mating assembly comprises at least one handle configured for permitting a user to rotate the mating assembly in a first direction and a second direction relative to said body portion.

12. The refueling adapter of claim 1, wherein said mating assembly is rotatably attached said body portion, wherein the dispenser connector assembly comprises at least one dispenser lug configured for interlocking engagement with a first L-shaped attachment channel within the dry-break coupling-style fuel dispenser, thereby allowing the mating assembly to be cammed onto the dry-break coupling-style fuel dispenser.

13. The refueling adapter of claim 12, wherein said body portion comprises a second end, said second end comprising a nozzle configured for opening a flapper within said twist-lock coupling-style fuel receiver.

14. A refueling adapter configured for permitting a vehicle having a twist-lock coupling-style fuel receiver fluidly connected to a fuel tank to be fueled from a fuel source having a dry-break coupling-style fuel dispenser, the refueling adapter comprising:

a body portion defining a fuel passageway therethrough, said body portion comprising a first end and a second end, wherein said first end comprises a dispenser connector assembly, said dispenser connector assembly configured for rotatable engagement with said dry-break coupling-style fuel dispenser, wherein said second end comprising a nozzle configured for opening a flapper within said twist-lock coupling-style fuel receiver, wherein the dispenser connector assembly comprises at least one dispenser lug configured for interlocking engagement with a first L-shaped attachment channel within the dry-break coupling-style fuel dispenser, thereby allowing the mating assembly to be cammed onto the dry-break coupling-style fuel dispenser; and a mating assembly attached to the body portion, said mating assembly comprising a twist-lock coupling-style connector, said twist-lock coupling-style connector configured for rotatable engagement with said twist-lock coupling-style fuel receiver, wherein when said body portion is connected to said dispenser connector assembly and said mating assembly is connected to said twist-lock coupling-style connector, fuel is permitted to flow from the fuel source, through the dry-break coupling-style fuel dispenser, through the refueling adapter, through the twist-lock coupling-style fuel receiver, and into said fuel tank, and wherein said mating assembly is rotatably attached said body portion.

15. The refueling adapter of claim 14, wherein the body portion comprises a radial flange at or adjacent said second end, and wherein said mating assembly comprises an engagement portion configured for engaging said radial flange, thereby allowing said mating assembly to be rotated relative to said body portion.

16. The refueling adapter of claim 15, wherein the radial flange comprises a radial race configured for receiving at least one ball bearing, and wherein said mating assembly comprises a mating radial race configured for receiving at least one ball bearing.

17. The refueling adapter of claim 14, wherein said mating assembly comprises at least one flange configured for engaging at least one receiver lug defined within the twist-lock coupling-style fuel receiver, thereby allowing the mating assembly to be cammed onto the twist-lock coupling-style fuel receiver.

18. A refueling adapter configured for permitting a vehicle having a twist-lock coupling-style fuel receiver fluidly connected to a fuel tank to be fueled from a fuel source having a dry-break coupling-style fuel dispenser, the refueling adapter comprising:

a body portion defining a fuel passageway therethrough, said body portion comprising a first end and a second end, said first end comprising a dispenser connector assembly, said dispenser connector assembly configured for rotatable engagement with said dry-break coupling-style fuel dispenser, wherein said body portion further comprises a radial flange at or adjacent said second end, wherein said radial flange further comprises a radial race configured for receiving at least one ball bearing; and a mating assembly attached to the body portion, said mating assembly comprising a twist-lock coupling-style connector, said twist-lock coupling-style connector configured for rotatable engagement with said twist-lock coupling-style fuel receiver, said mating assembly further comprising at least one handle configured for permitting a user to rotate the mating assembly in a first direction and a second direction relative to said body portion, said mating assembly further comprising at least one flange configured for engaging at least one race defined within the twist-lock coupling-style fuel receiver, thereby allowing the mating assembly to be cammed onto the twist-lock coupling-style fuel receiver, wherein said mating assembly comprises an engagement portion configured for engaging said radial flange, thereby allowing said mating assembly to be rotated relative to said body portion, and wherein said mating assembly comprises a mating radial race configured for receiving at least one ball bearing, wherein said dispenser connector assembly comprises at least one lug configured for interlocking engagement with a first L-shaped attachment channel within the dry-break coupling-style fuel dispenser, thereby allowing the mating assembly to be cammed onto the dry-break coupling-style fuel dispenser, and wherein when said body portion is connected to said dispenser connector assembly and said mating assembly is connected to said twist-lock coupling-style connector, fuel is permitted to flow from the fuel source, through the dry-break coupling-style fuel dispenser, through the refueling adapter, through the twist-lock coupling-style fuel receiver, and into said fuel tank.

19. The refueling adapter of claim 18, wherein said second end further comprises a nozzle configured for opening a flapper within said twist-lock coupling-style fuel receiver.

\* \* \* \* \*